United States Patent [19]
Green et al.

[11] Patent Number: 5,619,077
[45] Date of Patent: Apr. 8, 1997

[54] SYSTEM AND METHOD FOR PROVIDING ALTERNATE AC VOLTAGE

[75] Inventors: John D. Green, Granville; Gregory J. Sheka; Michael L. Thompson, both of Newark; John B. Hissong, Fredericktown; Ming D. Tan, Mt. Vernon, all of Ohio

[73] Assignee: Holophane Lighting, Inc., Newark, Ohio

[21] Appl. No.: 210,882

[22] Filed: Mar. 18, 1994

[51] Int. Cl.$^6$ .................................................. H02J 7/00
[52] U.S. Cl. ........................... 307/64; 307/85; 307/38; 364/492
[58] Field of Search ....................... 307/64, 66, 85–87, 307/71, 57, 43, 38, 39, 18; 364/492, 493

[56] References Cited

U.S. PATENT DOCUMENTS

| | | | |
|---|---|---|---|
| 4,488,198 | 12/1984 | Christen et al. | 361/20 |
| 4,673,826 | 6/1987 | Masson | 307/66 |
| 4,876,460 | 10/1989 | Johnson | 307/64 |
| 5,184,025 | 2/1993 | McCurry et al. | 307/66 |
| 5,315,161 | 5/1994 | Robinson et al. | 307/66 |
| 5,410,713 | 4/1995 | White et al. | 395/750 |
| 5,458,991 | 10/1995 | Severinsky | 429/61 |

*Primary Examiner*—William M. Shoop, Jr.
*Assistant Examiner*—Jonathan S. Kaplan
*Attorney, Agent, or Firm*—Brooks & Kushman P.C.

[57] ABSTRACT

A system and method for providing an alternate AC voltage to an electrical load having a main AC voltage. The system and method include a signal generator for generating a main AC voltage signal representing the value of the main AC voltage, and a processor for processing the main AC voltage signal to determine a status of the main AC voltage, a main AC voltage failure time period, and a main AC voltage restoration time period. The system and method also include a control signal generator for generating a control signal in response to the main AC voltage signal, the main AC voltage failure time period, the main AC voltage restoration time period, and a pre-selected delay time period, and a switch for switching the electrical load between the main AC voltage and the alternate AC voltage in response to the control signal.

22 Claims, 30 Drawing Sheets

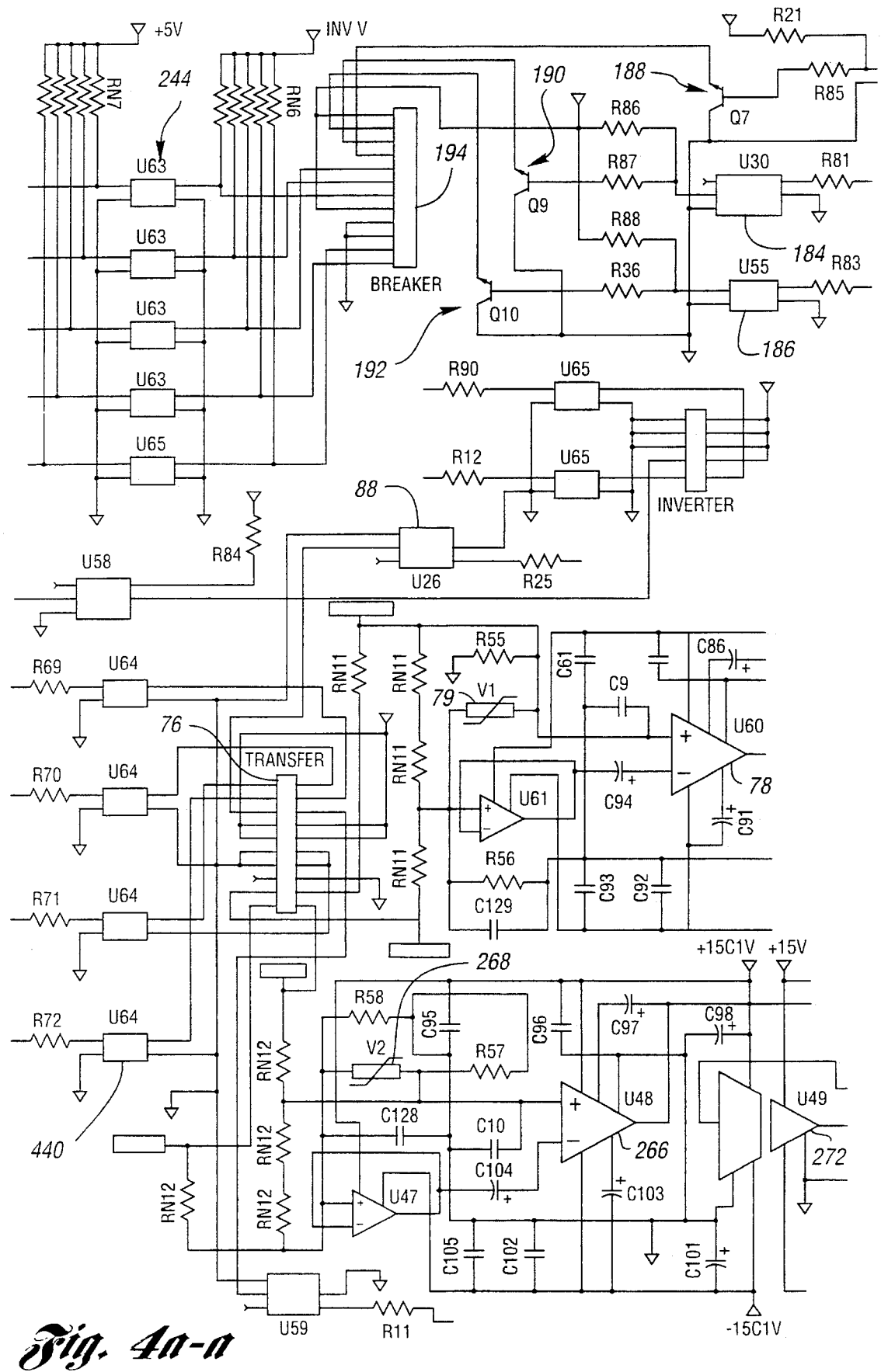
Fig. 4a-a

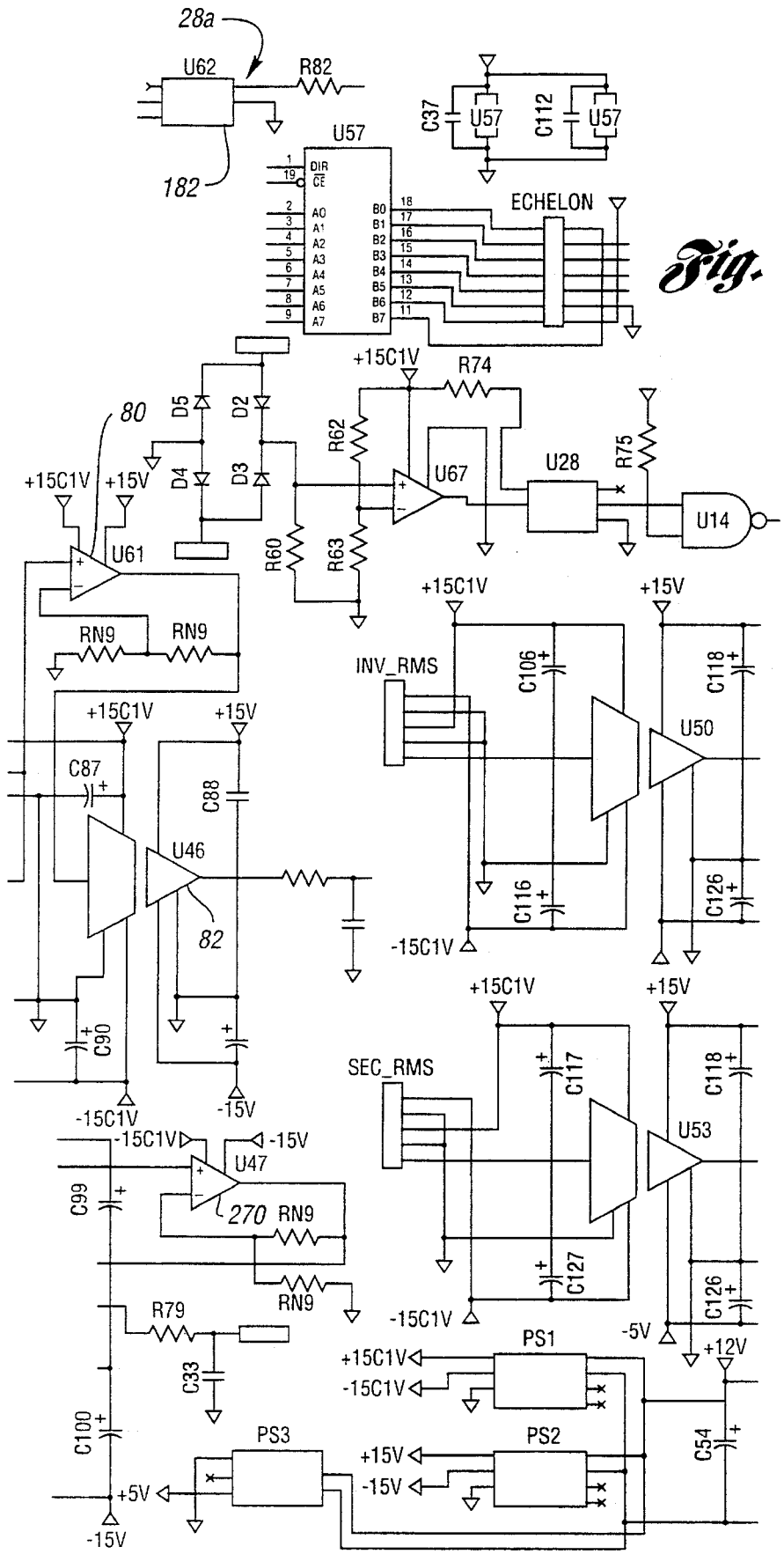
Fig. 4a-b

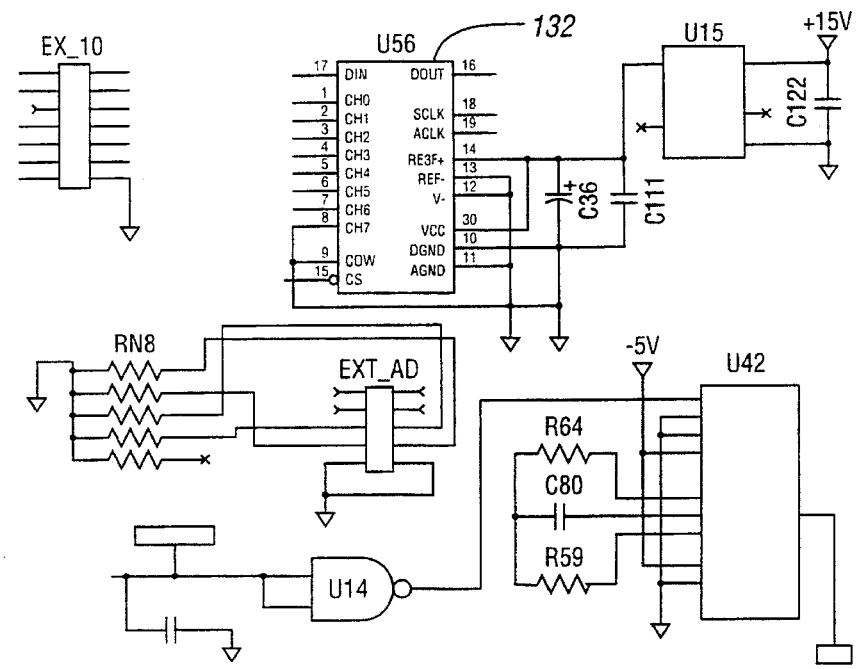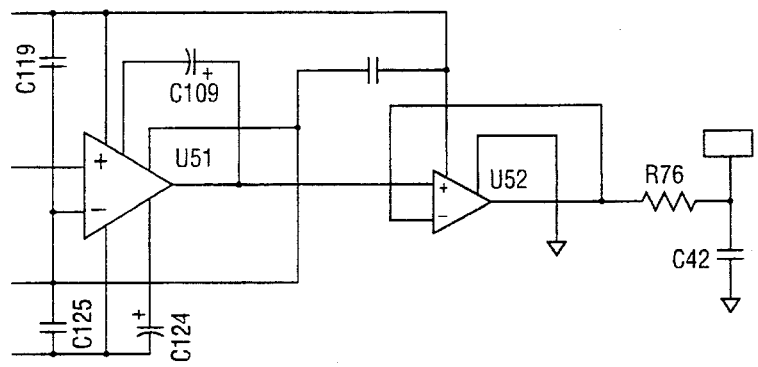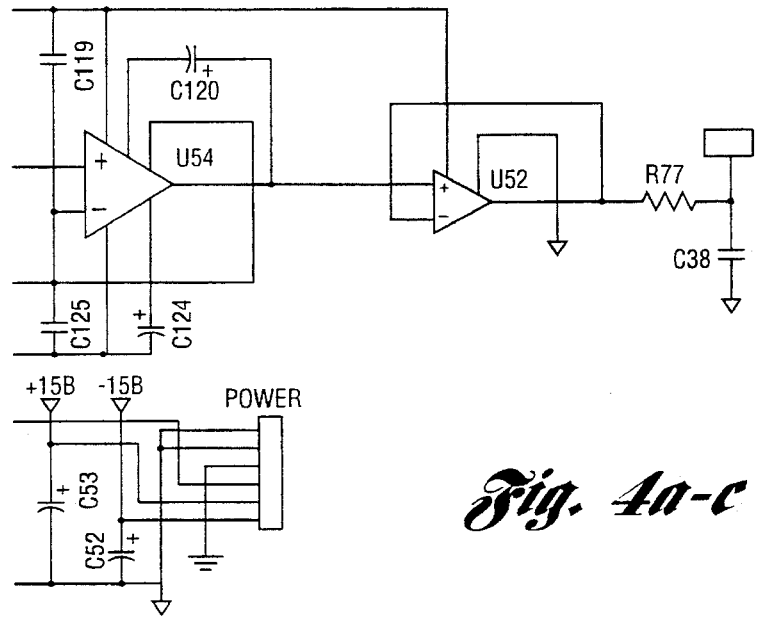
Fig. 4a-c

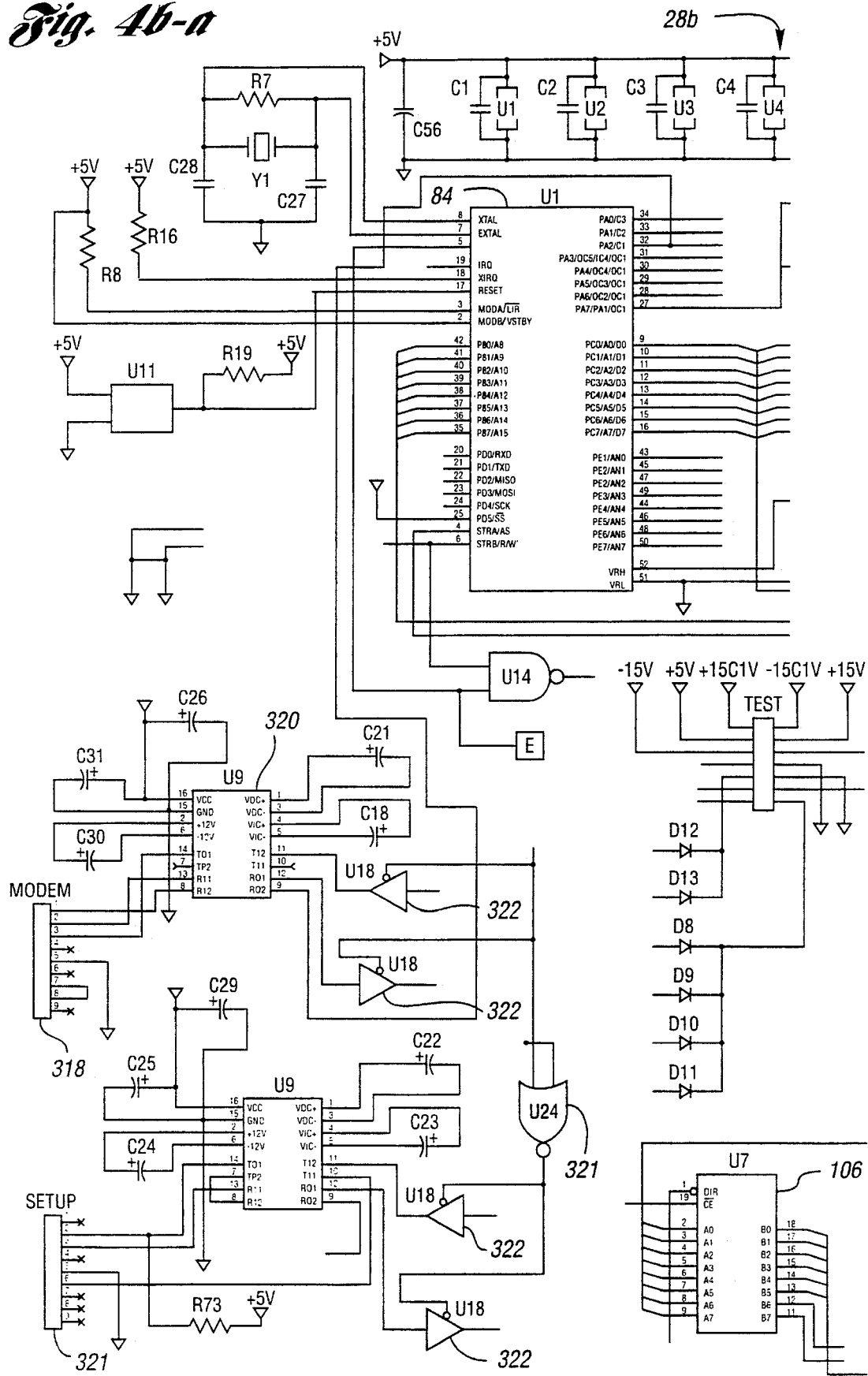
Fig. 4b-a

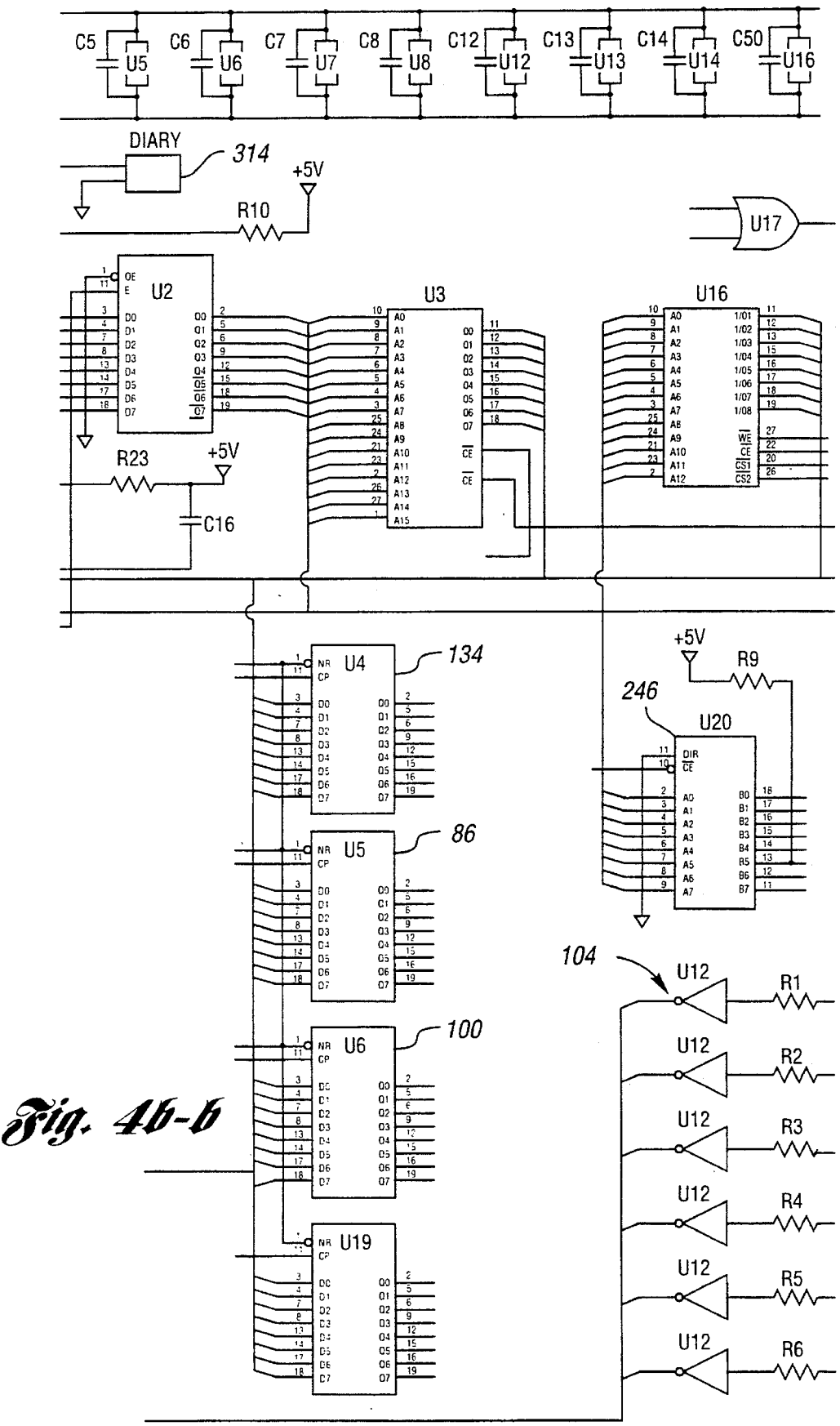
Fig. 4b-b

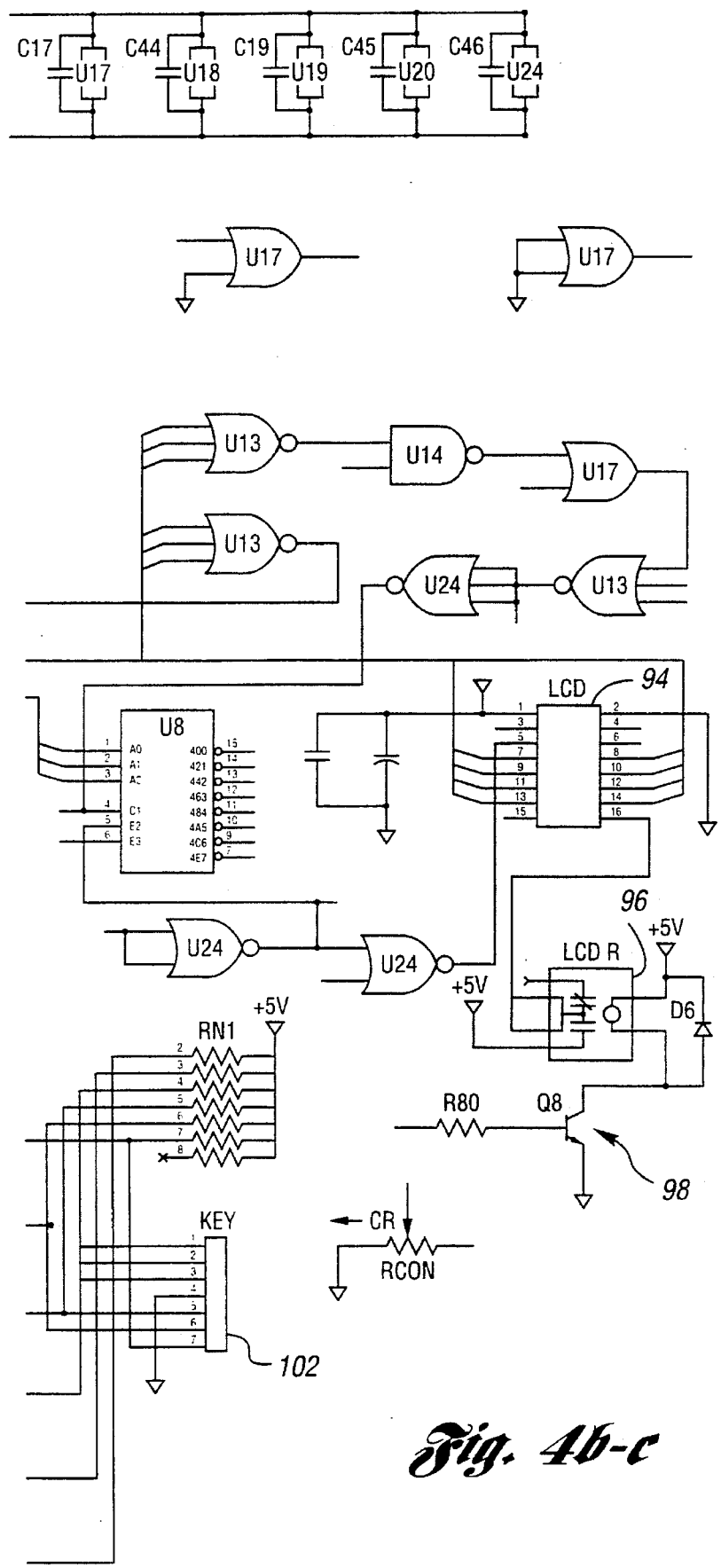
Fig. 4b-c

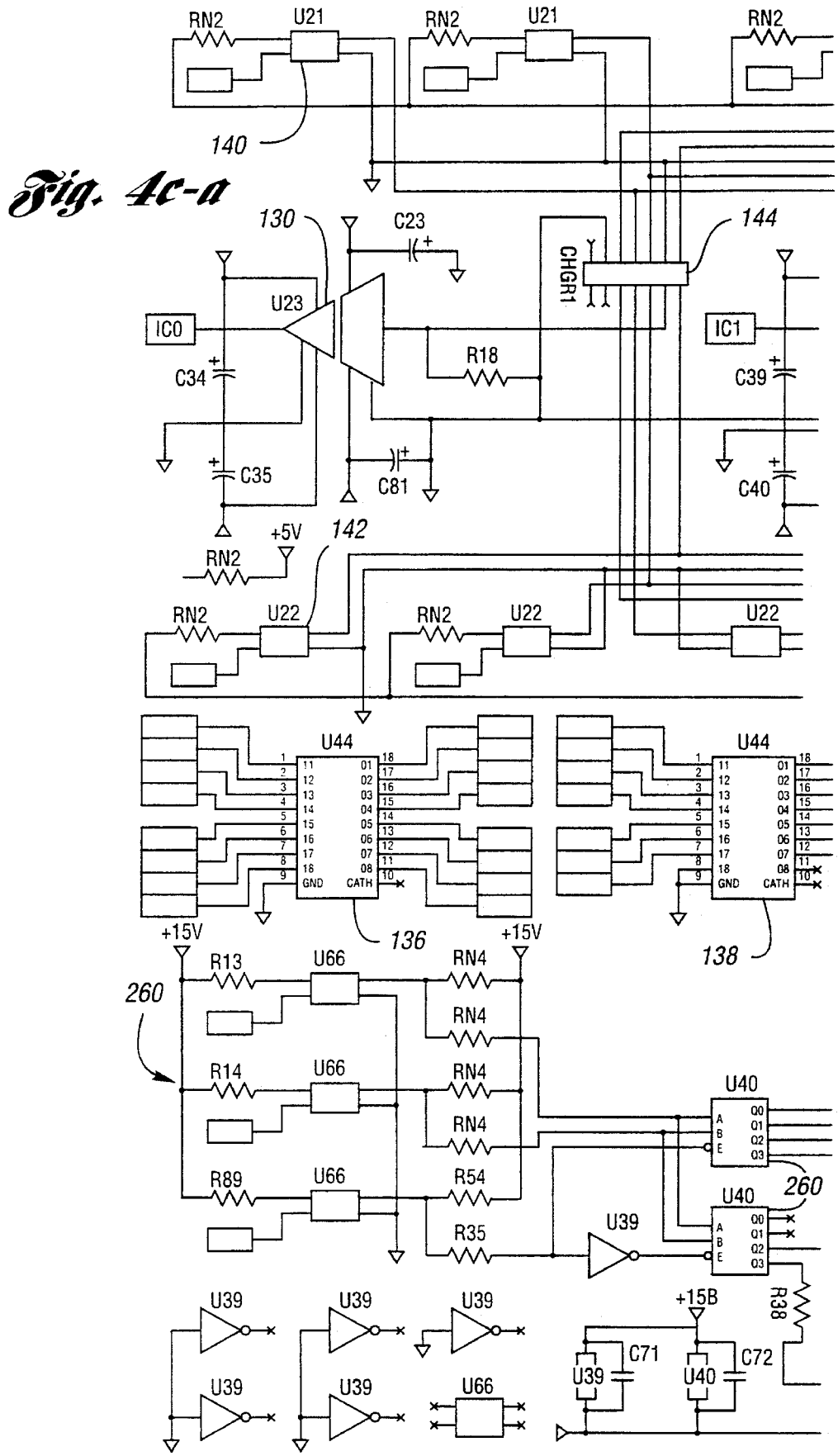
Fig. 4c-a

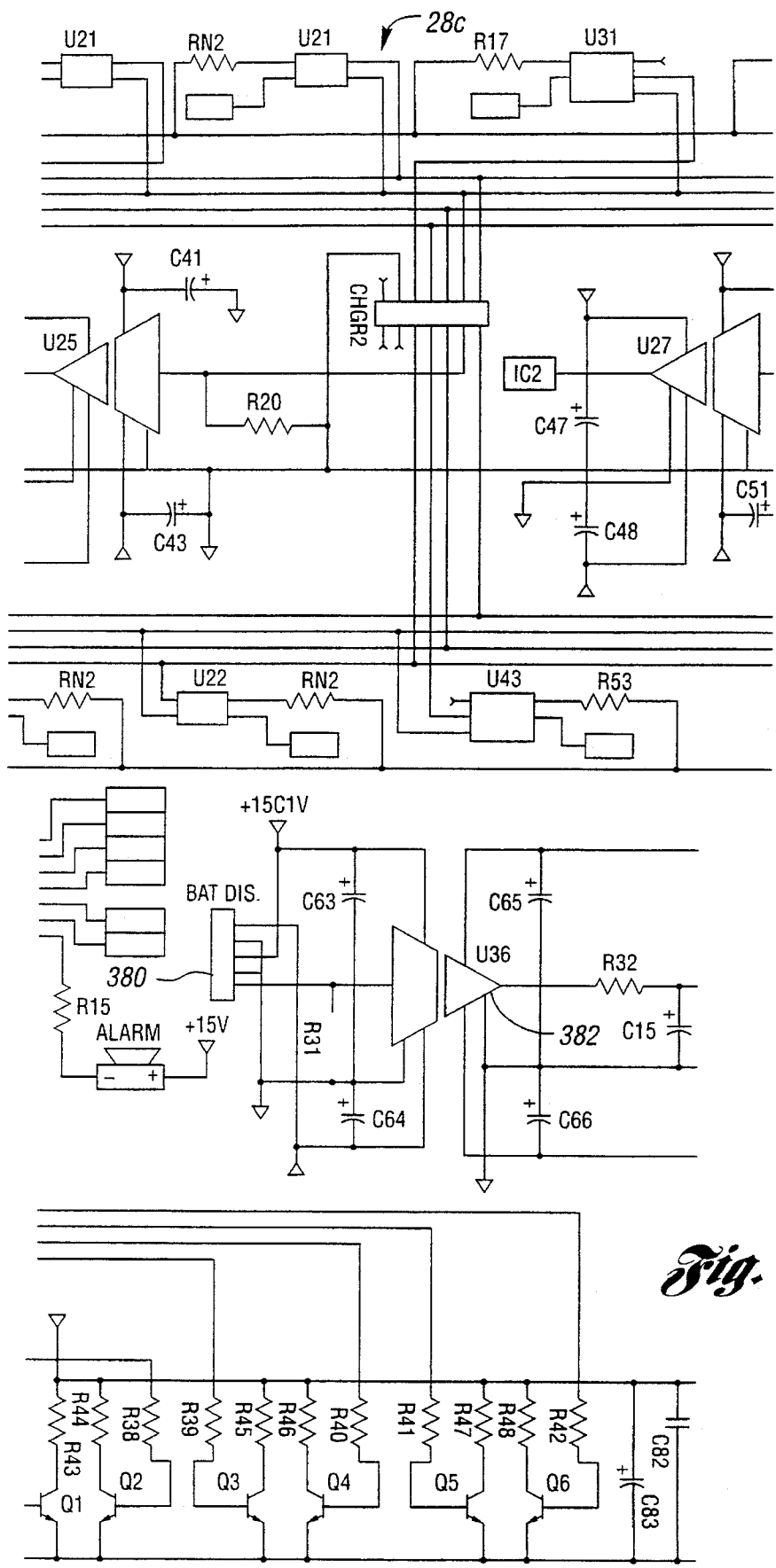
Fig. 4c-b

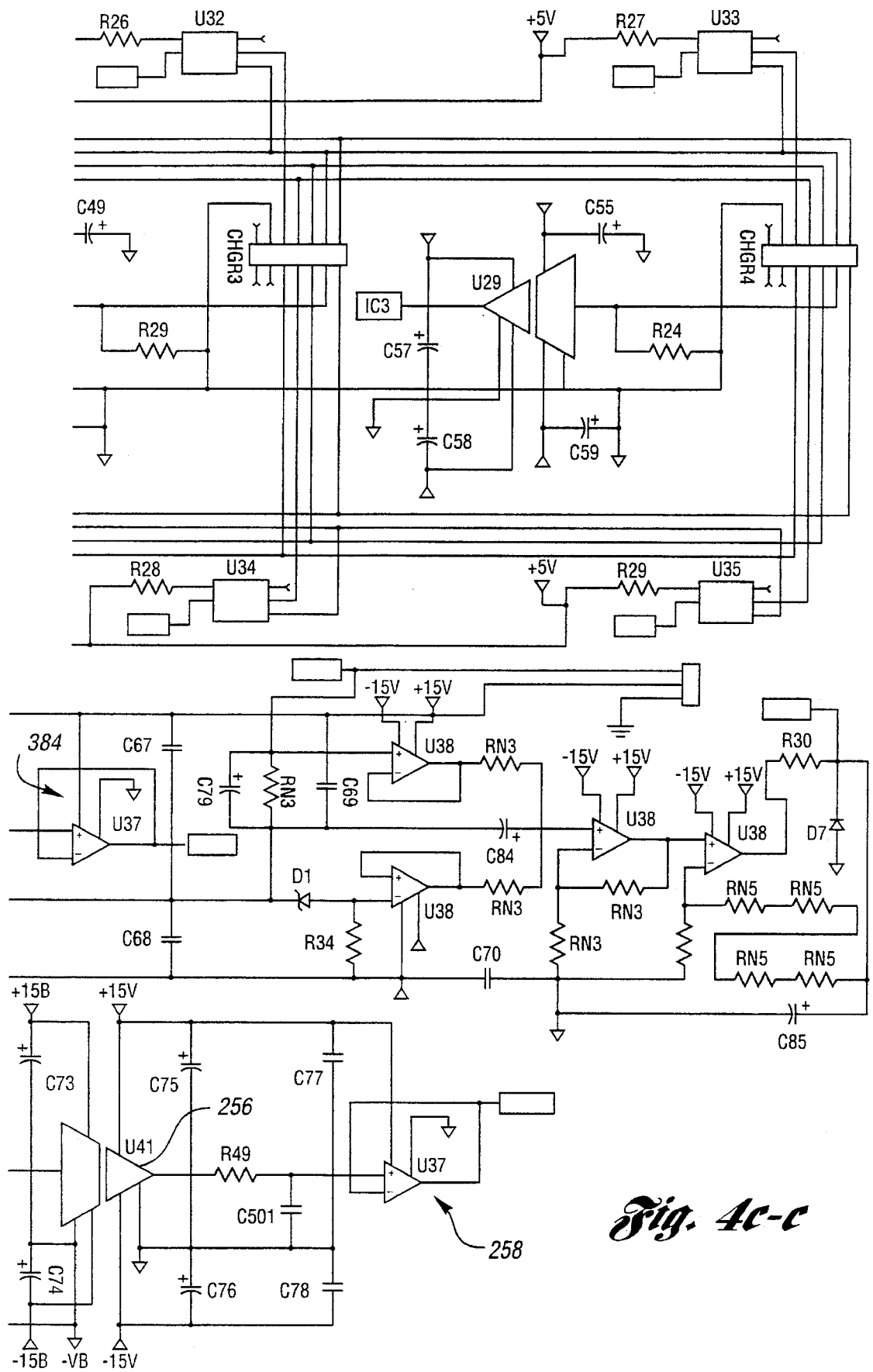
Fig. 4c-c

SYSTEM AND METHOD FOR PROVIDING ALTERNATE AC VOLTAGE

TECHNICAL FIELD

This invention relates to a system and method for providing an alternate AC voltage to an electrical load having a main AC voltage failure.

BACKGROUND ART

Alternate power systems for use during utility power failures such as outages (blackouts) or low voltage situations (brownouts) are becoming increasingly common. In the event of utility power failures, such systems provide an alternate source of AC voltage for important electrical loads, such as emergency lighting, computers, or safety devices, thereby allowing such loads to operate or continue to operate for hours at a time. Such operation or continued operation can provide important safety benefits. In a commercial establishment, for example, operation of emergency lighting loads allows customers and employees to exit the establishment with enhanced visibility during a utility power failure.

Indeed, alternate power systems have proven so beneficial that they are often required in many different types of facilities including schools, hospitals, water treatment plants, prisons, commercial establishments and industrial plants. These same requirements also demand regularly recorded maintenance and testing of such systems to ensure their operability when utility power failures ultimately occur.

Various systems and methods are known to provide alternate power in the event of utility power failures. Among the most common are internal combustion engine driven generators. Such generators, however, can suffer from space requirement, noise, ventilation and maintenance problems. Moreover, the regularly recorded testing of such generator systems and methods can be expensive and troublesome as it must be performed manually.

Most importantly, however, such generator systems and methods for providing alternate power in the event of utility power failure are incapable of adjusting to the type of electrical load present. More specifically, when utility power is restored, emergency lighting loads must be deactivated and primary lighting loads must be reactivated. Where such primary lighting loads are incandescent or fluorescent in nature, such reactivation may be undertaken immediately.

However, where such primary lighting loads are High Intensity Discharge (HID) in nature, such as Metal Halide or High Pressure Sodium (HPS), reactivation may not be undertaken unless and until sufficient time has elapsed since the start of the utility power failure for the primary lighting loads to have properly cooled. In such cases, reactivation may have to be delayed for as long as 20–30 minutes, depending on how long the utility power failure lasted.

The generator systems and methods described above attempt to overcome this problem by assuming that all utility power failures are momentary, and delaying reactivation for a period of time equal to the "cool down" period of the primary lighting load present. However, since reactivation actually need only be delayed for a period of time equal to the cool down period of the primary lighting load minus the duration of the utility power failure, this is only a partial solution. Indeed, in many situations, such systems and methods remain active for longer than is necessary, wasting fuel and shortening generator life.

Solid state sinewave inverter systems and methods are also commonly utilized to provide alternate power in the event of utility power failures. This is especially true where computer equipment and energy efficient lighting type loads are commonly found. Such systems and methods solve many of the space requirement, noise and maintenance problems associated with the aforementioned generator systems and methods.

Solid state inverter systems and methods operate on the principle of electronically inverting a DC input voltage (from a DC power source such as a battery) to produce an AC output voltage. A number of different types of solid state inverters may be used in such systems and methods, including square wave inverters, ferroresonant inverters, and Pulse-Width Modulated (PWM) inverters.

Such inverter systems and methods, however, still suffer from a variety of problems. First, as with generators, the regular testing required for such systems and methods must still be conducted and recorded manually. Moreover, as with generators, such inverter systems and methods also suffer from the HID lighting load reactivation problem. Indeed, this problem is worse with such inverter systems and methods than with generators. Not only is the battery power wasted and batter life shortened, the battery recharging time is lengthened as well.

Consequently, a need has developed for a solid state inverter system and method for providing alternate power to an electrical load in the event of utility power failure that overcomes the reactivation problem associated with HID primary lighting loads. Such a system and method would also be microprocessor controlled to automate required testing and recordation of results, as well as to provide various instantaneous output messages for improved operation and maintenance.

DISCLOSURE OF INVENTION

Accordingly, it is the principle object of the present invention to provide an improved system and method for providing alternate AC voltage to an electrical load having a main AC voltage failure.

Another object of the present invention is to provide a system and method for providing an alternate AC voltage to an electrical load having a main AC voltage failure that, after main AC voltage restoration, transfers the electrical load back to the main AC voltage as soon as possible.

Another object of the present invention is to provide a system and method for providing an alternate AC voltage to an electrical load having a main AC voltage failure that automatically provides a plurality of output messages for improved operation, maintenance and record keeping.

According to the present invention, then, a system and method for providing an alternate AC voltage to an electrical load having a main AC voltage are provided. The system comprises means for generating a status signal representing the status of the main AC voltage, and means for processing the status signal to determine a main AC voltage failure time period and a main AC voltage restoration time period. The system of the present invention further comprises means for generating a control signal in response to the main AC voltage failure time period, the main AC voltage restoration time period, and a pre-selected delay time period, and mean for switching the electrical load between the main AC voltage and the alternate AC voltage in response to the control signal.

The method of the present invention for providing an alternate AC voltage to an electrical load having a main AC voltage comprises generating a status signal representing the status of the main AC voltage and processing the status signal to determine a main AC voltage failure time period and a main AC voltage restoration time period. The method of the present invention further comprises generating a control signal in response to the main AC voltage failure time period, the main AC voltage restoration time period, and a pre-selected delay time period, and switching the electrical load between the main AC voltage and the alternate AC voltage in response to the control signal.

These and other objects, features and advantages will be readily apparent upon consideration of the following description in conjunction with the accompanying drawings.

BRIEF DESCRIPTION OF DRAWINGS

FIGS. 4(a), 4(b) and 4(c) are detailed schematics of the controller circuit board of the system of the present invention for providing an alternate AC voltage to an electrical load having a main AC voltage.

FIG. 9a–d are a setup flowchart of the system and method of the present invention for providing an alternate AC voltage to an electrical load having a main AC voltage.

BEST MODE FOR CARRYING OUT THE INVENTION

Figure 1:
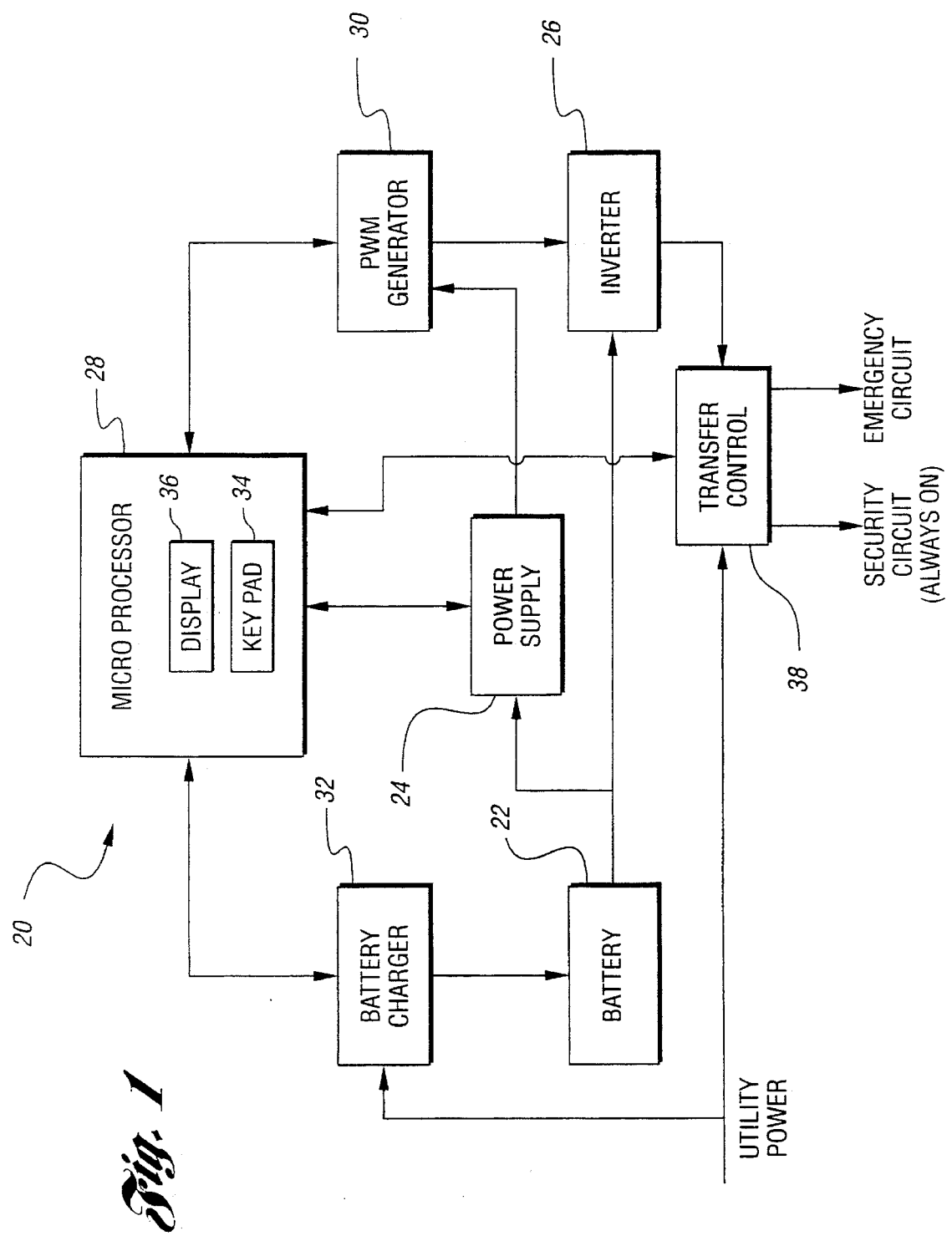
FIG. 1 is a block diagram of the system of the present invention for providing an alternate AC voltage to an electrical load having a main AC voltage.
Figure 2:
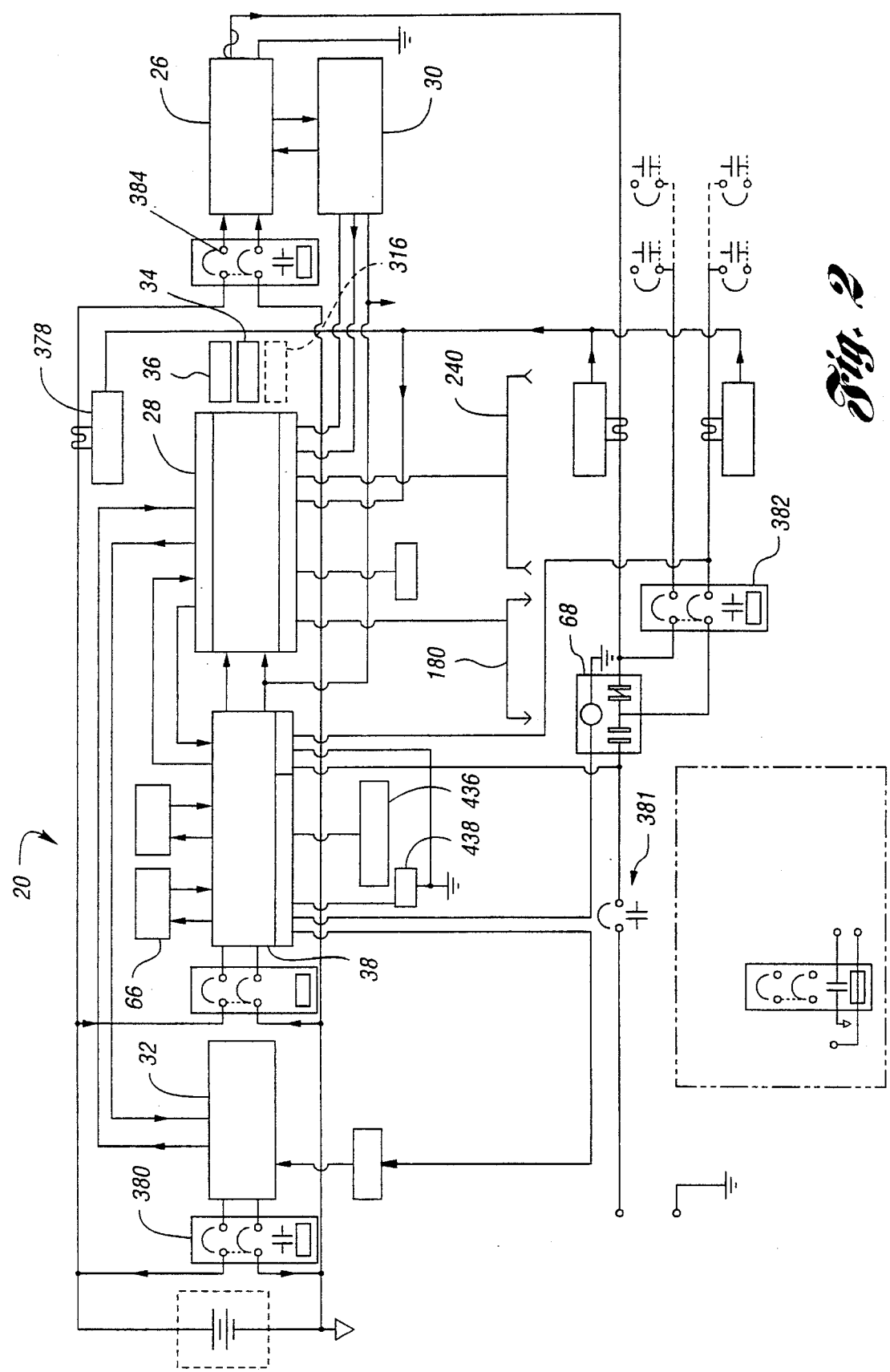
FIG. 2 is a simplified schematic of the system of the present invention for providing an alternate AC voltage to an electrical load having a main AC voltage.

Referring first to FIGS. 1 and 2, a block diagram and a simplified schematic of the system of the present invention for providing an alternate AC voltage to an electrical load having a main AC voltage are shown, respectively, each denoted generally by reference numeral 20. As seen therein, a DC power source (22) is provided for supplying a DC voltage and preferably comprises two 12 volt batteries for supplying 24 volts DC. Additional batteries may be added in series to provide up to 96 volts DC at a constant DC current. Thereafter, additional batteries may be added in parallel with corresponding increases in the DC current. In such a fashion, electrical components rated for higher currents need not be employed since parallel inverters (26) are employed as parallel batteries are added. Moreover, the system (20) and method of the present invention can thus provide anywhere from 0.75 to 12 KVA.

DC power source (22) is provided in electrical communication with a power supply (24) and an inverter (26). Power supply (24) is itself provided in electrical communication with a microprocessor (28). Power supply (24) converts the selected DC input voltage from DC power source (22) (which may vary from 12 to 96 volts DC) to a constant 12 volt DC output voltage for powering microprocessor (28). To accommodate the wide range of possible DC input voltages with a single design, power supply (24) is preferably provided as disclosed in a co-pending application entitled "Wide Input Power Supply" filed the same day and assigned to the same assignee as the present application, which is incorporated herein by reference.

Power supply (24) also powers, and is thus provided in electrical communication with, a Pulse Width Modulated (PWM) waveform generator (30), which is itself provided in electrical communication with inverter (26). PWM generator (30) and inverter (26) together invert the DC voltage from DC power source (22) to produce an alternate AC voltage. Moreover, for providing an alternate AC voltage suitable for use with a wide variety of electrical loads, especially computer equipment and energy efficient lighting, PWM generator (30) and inverter (26) are preferably provided as disclosed in a co-pending application entitled "System And Method For Controlling DC To AC Voltage Inverter" filed the same day and assigned to the same assignee as the present application, which is incorporated herein by reference.

Referring still to FIGS. 1 and 2, DC power source (22) is also provided in electrical communication with at least one battery charger (32), which charges the battery or batteries that make up DC power source (22). For that purpose, battery charger (32) is itself provided in electrical communication with a main AC voltage (i.e., utility power).

As previously noted, microprocessor (28) is provided in electrical communication with power supply (24). Microprocessor (28) is further provided in electrical communication with PWM generator (30), charger (32) and a transfer control (38) for monitoring and control thereof. Microprocessor (28) is also provided with a keypad (34) and a display (36) for inputting and outputting various data, respectively. Such monitoring, control, inputting and outputting are each described in greater detail below.

Finally, inverter (26) is also provided in electrical communication with transfer control (38) which, as previously noted, is itself provided in electrical communication with microprocessor (28). Transfer control (38) is further provided in electrical communication with the main AC voltage (i.e., utility power).

In the event of a main AC voltage failure, transfer control (38) switches the electrical load between the main AC voltage and the alternate AC voltage. The electrical load so switched is denoted in FIG. 1 as a security circuit, and may include computer equipment or safety devices. At the same time, an emergency circuit, typically comprising emergency lighting, is also activated. As will be described in greater detail below, main AC voltage failure includes a low voltage situation (brownout) as well as a complete outage (blackout).

Figure 3:
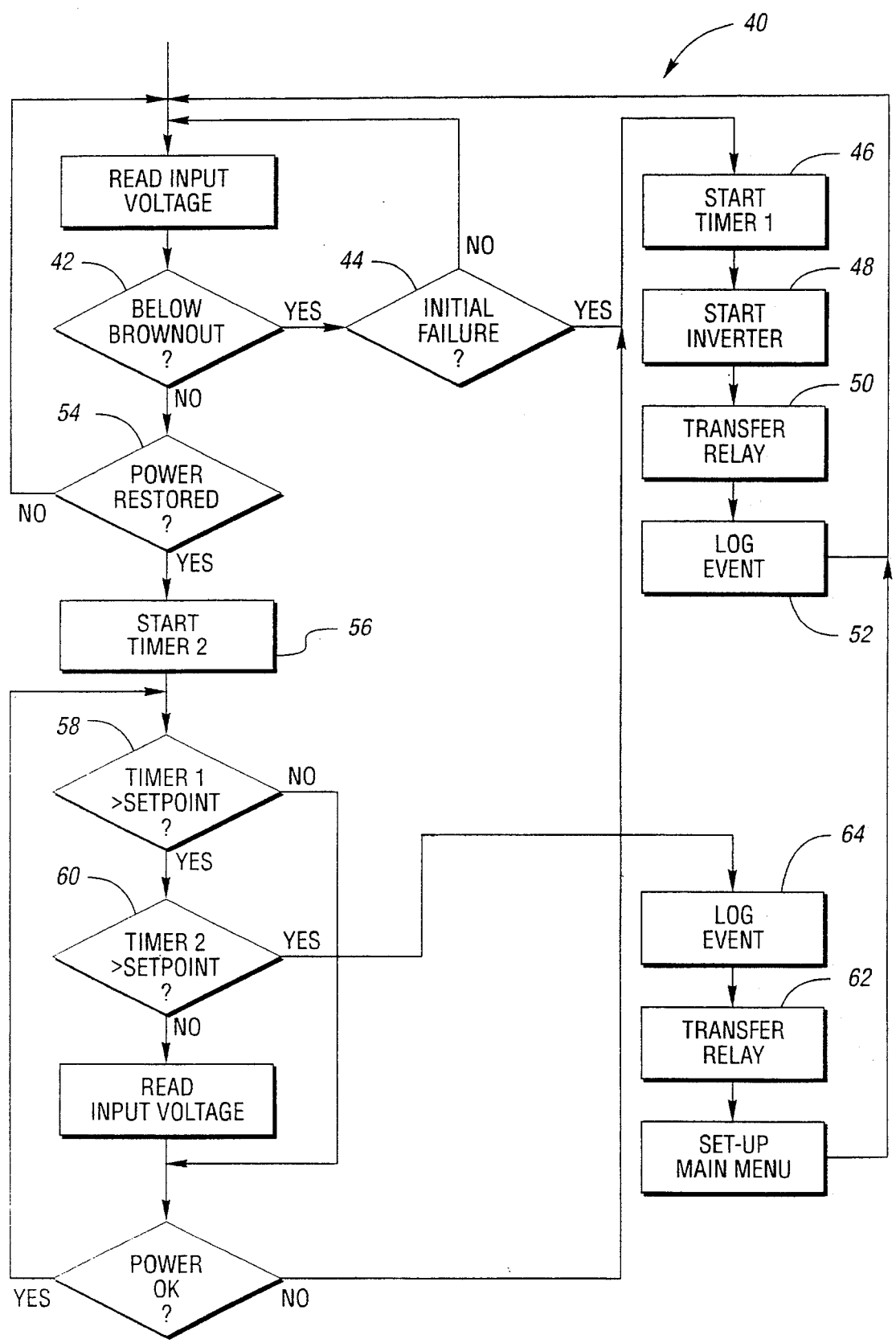
FIG. 3 is a voltage transfer flowchart of the system and method of the present invention for providing an alternate AC voltage to an electrical load having a main AC voltage.
Figure 5A:
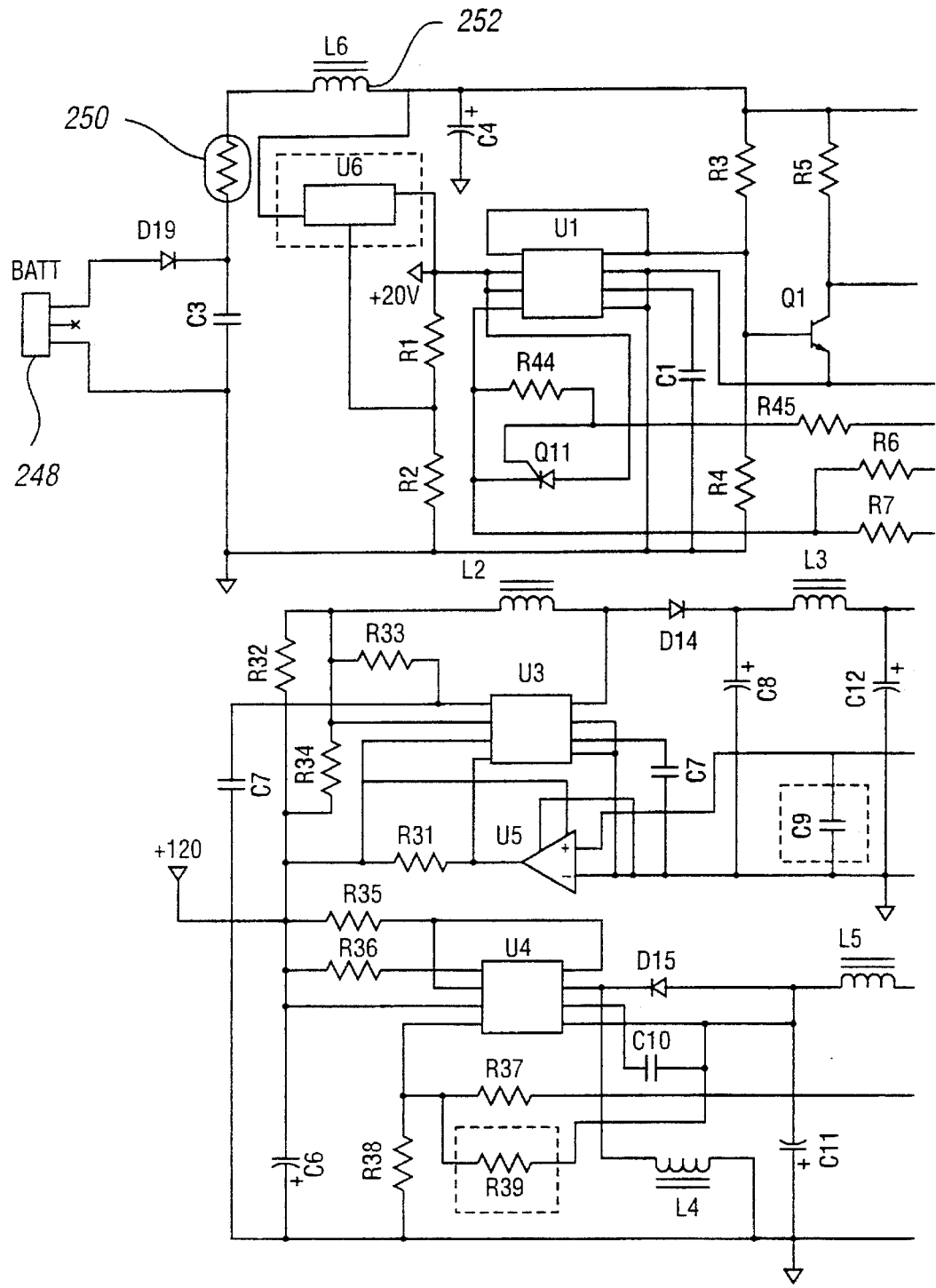
FIG. 5 is a detailed schematic of the transfer circuit board of the system of the present invention for providing an alternate AC voltage to an electrical load having a main AC voltage.
Figure 5B:
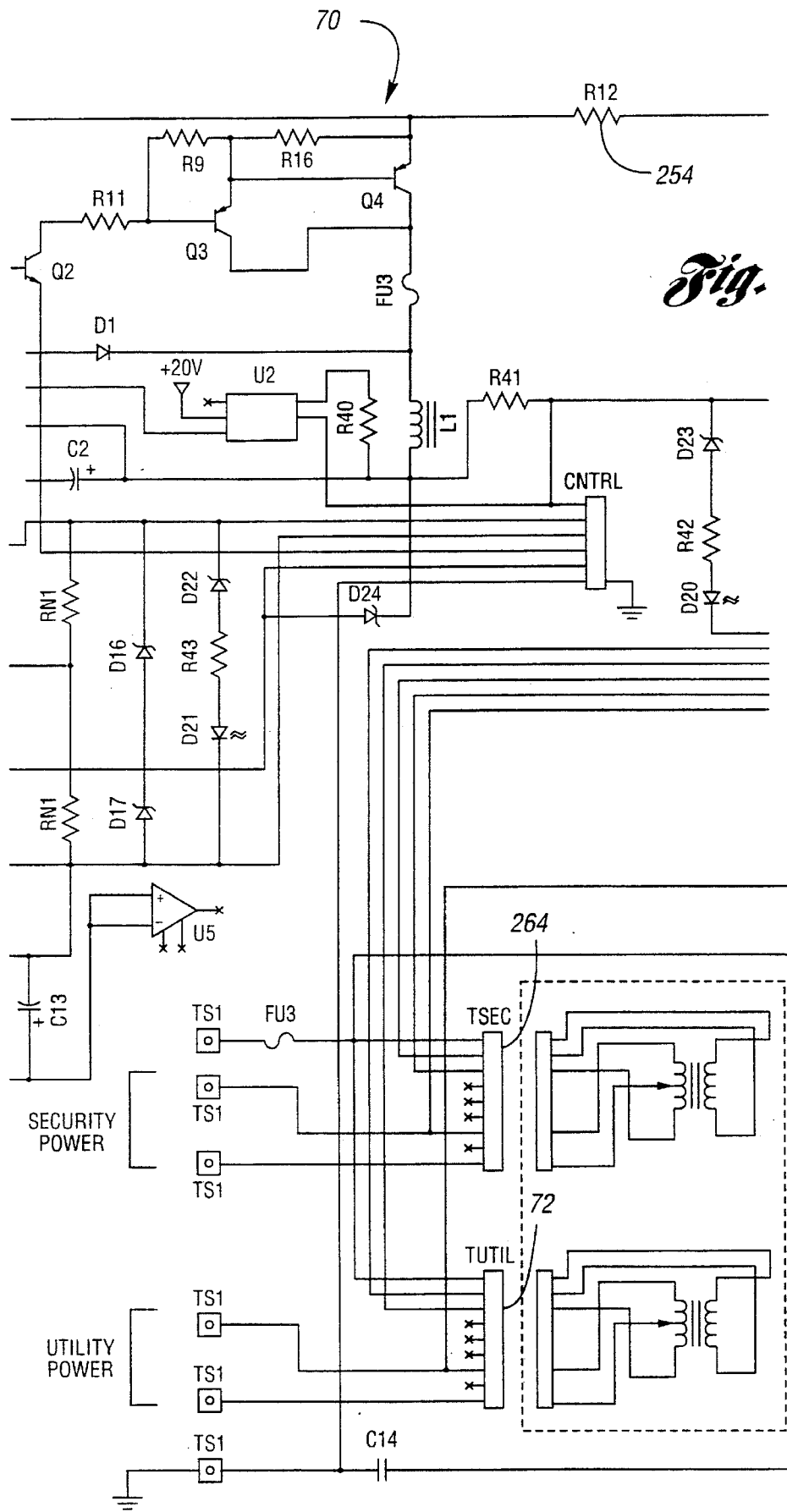
Figure 5C:
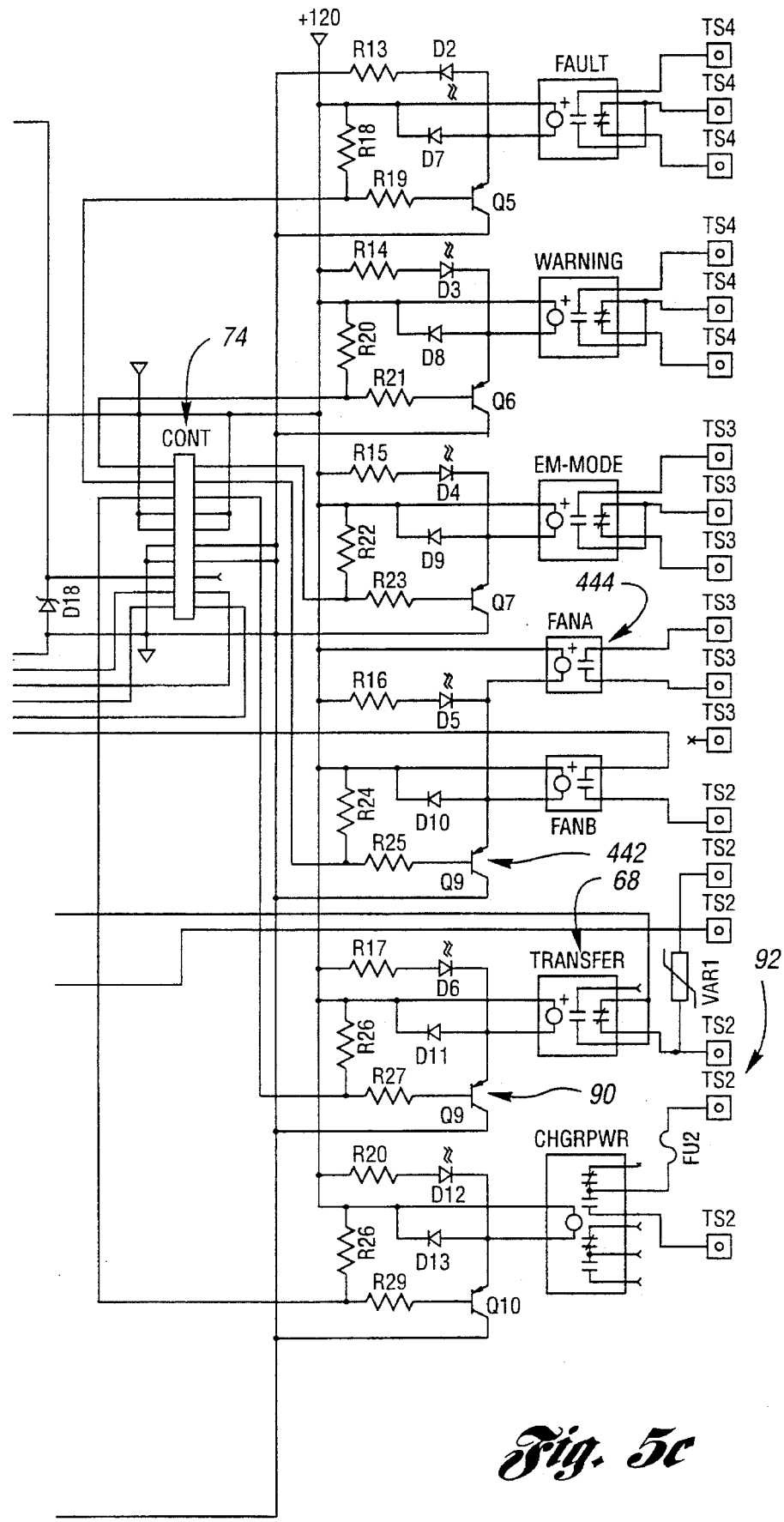

Referring next to FIG. 3, a voltage transfer flowchart of the system (20) and method of the present invention for providing an alternate AC voltage to an electrical load having a main AC voltage is shown, denoted generally by reference numeral 40. Voltage transfer flowchart (40) depicts that aspect of the present invention which solves the reactivation problem associated with HID primary lighting loads in prior art systems and methods for providing alternate power.

In that regard, the system (20) and method of present invention provides the owner of a facility, such as a school or hospital, a feature referred to as user selectable delay. User selectable delay allows the owner to designate what type of primary lighting load is present in the facility. By inputting the type of primary lighting load through keypad (34), microprocessor (28) can determine how long alternate power must continue to be supplied, after main power is restored, to provide lighting to the facility.

While there are many different types of lighting loads, each has been placed in one of three groups: Metal Halide (MH), High Pressure Sodium (HPS), and Fluorescent/Incandescent (Fl/Inc). By designating a primary lighting load, the low voltage point ("brownout voltage") below which that primary lighting load will cease to function is also established. Below such brownout voltage, microprocessor (28) will switch to alternate power (42).

Referring still to FIG. 3, when utility input power first fails (44), the system (20) and method of the present invention starts a first timer (46) that keeps track of the amount of time since the beginning of the power outage (failure time), starts (48) inverter (26), transfers (50) the electrical load of the facility to alternate power, and records the event (52). When the input voltage is again restored to an acceptable value (54), a second timer is started (56) that keeps track of the time since the end of the power outage (restoration time). As previously noted, HID sources, both metal halide and high pressure sodium, need time to cool down before they can restrike their arc streams. After the arcs are established, they need time to warm up before they can supply sufficient light.

If the power outage is very short, the delay to return to utility power will need to be longer for the HID sources than if the outage was much longer. In the short outage case, the HID sources must cool down and reestablish their arcs before the primary lighting is functional, a process that may take up to 20 minutes for the metal halide lighting equipment. If the outage has been over 10 minutes, the HID sources have cooled down prior to the return of the utility power, therefore the delay to switch off the emergency lighting can be shorter than that described above, since the wait only has to allow the HID sources to reestablish their arcs.

The brownout voltages and timer setpoint periods discussed above are as follows:

| Source | Brownout Voltage (% Nominal) | Timer1 Beginning of Outage | Timer2 End of Outage |
|---|---|---|---|
| Fl/Inc | 60% | 0.5 Min | 0.5 Min |
| HPS | 70% | 4.0 Min | 2.0 Min |
| MH | 70% | 20.0 Min | 10.0 Min |

Only when the time since the beginning of the outage and the time since the end of the outage each exceed their respective setpoint period (58, 60) will microprocessor (28) generate a control signal operative to transfer the electrical load of the facility back to main (utility) power (62). Like the transfer to alternate power, such transfer is also recorded (64).

By tracking the time since the end of the outage (failure time period), the time since the beginning of the outage (restoration time period), and the source type (i.e., delay time period), processor (28) can allow time for the primary lighting to be restored, but minimize the demands on the system (20) and method for providing alternate power of the present invention. In such a fashion, battery power from DC power source (22) will be conserved so longer run times will be available if there is another utility outage prior to complete recharge thereof.

Referring again to FIG. 2, in general terms, user selectable delay utilizes display (36), keypad (34) and transfer module (38). As seen therein, the system (20) and method of the present invention pass the utility input voltage through the transfer module (38) to a transformer (66) that steps the voltage down to approximately 5 volts. This voltage is then sent to the system controller (28) for processing.

In such a fashion, the system (20) and method of the present invention generate a main AC voltage signal representing the value of the main AC voltage and process the main AC voltage signal to determine the status of the main AC voltage (i.e., whether the main AC voltage has failed or has been restored). In that regard, any voltage below the brownout voltage level indicates main AC voltage failure, while any voltage above indicates main AC voltage restoration. Similarly, the system (20) and method of the present invention also process the main AC voltage signal to determine a main AC voltage failure time period and a main AC voltage restoration time period.

In response to the main AC voltage signal, main AC voltage failure time period, main AC voltage restoration time period and the pre-selected delay time period, controller (28) generates a control signal operative to control a transfer relay (68) for transferring the electrical load between main (utility) voltage and alternate voltage. As previously noted, keypad (34) is used to input the primary lighting load, which automatically establishes both the brownout voltage level and the delay time period.

Referring now to FIGS. 4(a), 4(b), 4(c) and 5, detailed schematics of the controller circuit board and the transfer circuit board of the system (20) of the present invention for providing an alternate AC voltage to an electrical load having a main AC voltage are shown, respectively, denoted by reference numerals 28a, 28b, 28c and 70. As seen therein, the specific operation of the circuitry is as follows.

Utility (high AC) voltage is supplied to Terminal Strip 1 (TS1), pins 4 and 5, on the transfer board (70) where it is fed into transformer TUTIL (72) and stepped down to a lower (AC) voltage. This lower AC voltage is fed to the controller board (28a) through pin 17 of the CONT1 connector (74). On the controller board (28a), the voltage on pin 17 of the TRANSFER connector (76) is fed to an RMS converter U60 (78), which converts the low voltage AC into a DC level proportional to the true RMS value of the AC signal. AC overvoltage protection is provided by variable resistor (varistor) V1 (79).

The DC signal is fed to U61 (80), which sets the proper DC differential level to the signal to allow proper interpretation of the level by the microprocessor (28). This DC signal is passed through U46 (82), which isolates the RMS converter circuitry from the digital section of the microprocessor (28). The DC output of U46 (82) (labeled AC__IN) is fed into controller board (28b) at pin 43 of microprocessor U1 (84) which can read the DC level that represents the level of the AC utility line.

The microprocessor (28) controls the transfer relay (68) by outputting a digital signal from controller board (28b) on pin 2 of U5 (86) that is fed into controller board (28a) at pin 1 of latch U26 (88). The DC level generated by U26 (88) is output on pin 5 to pin 6 of the TRANSFER connector (76), where it is fed to the transfer board (70). The transfer board (70) receives the signal on pin 6 of the CONT1 connector (74) that is connected to drive transistor Q9 (90) that activates the TRANSFER relay (68). This relay applies power to the off-board contactor through TS2 (92). An off-board contactor then switches the electrical load of the facility between utility and alternate power.

Display (36) is preferably liquid crystal and outputs various information to the user including what delays are in effect and what options are available to choose from. Display (36) is shown on controller board (28b) as LCD (94). LCD (94) is driven directly by U1 (84) via data bus lines AD0 through AD7. A back-lit option for LCD (94) is controlled by LCD_R (96), which is a relay that energizes lead 16 of the LCD (94). LCD_R (96) is controlled through transistor Q8 (98) by latch U6 (100), pin 16, which is under control of U1 (84). Keypad (34), which allows the user to input lighting designations, is connected to controller board (28b) via a KEY connector (102). Pins 1,2,3,5,6, and 7 of KEY connector (102) are fed through buffers on U12 (104) to a latch U7 (106), which is read directly by U1 (84) through data lines AD0 through AD7.

Referring again to FIG. 1, to allow a single design of components to be grouped in a modular format to build larger systems (20), multiple battery chargers (32) must be paralleled to charge larger banks of batteries (22). Because of manufacturing and other low power consumption type differences in components, paralleled chargers (32) will not share the charging load equally. In the extreme case, one charger (32) in a four set grouping may supply all the current to replenish the batteries (22) while the other three are far enough out of tolerance that they supply no current. Besides reliability concerns with one charger (32) carrying excessive current, the recharging of the batteries (22) may not occur within required time limits with the reduced total charger current.

For multiple chargers (32), the system (20) and method of the present invention keep the output of all chargers balanced. The total charger current can also be displayed on the display (36) of the microprocessor (28). The system (20) and method of the present invention are aware of the presence of multiple chargers (32) by the catalog number that is entered into the memory of the microprocessor (28) during factory set-up.

Figure 6:
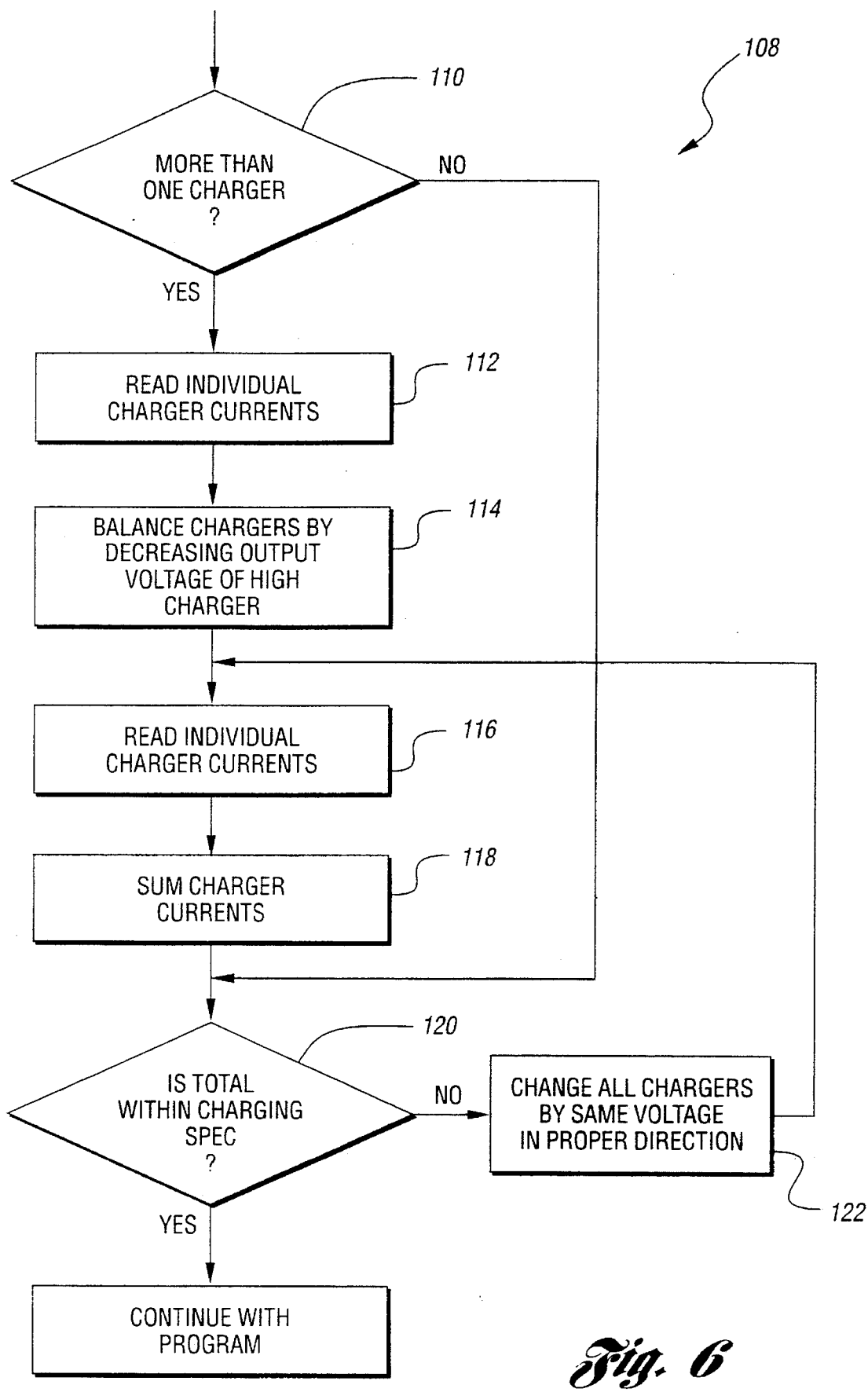
FIG. 6 is a balanced charger flowchart of the system and method of the present invention for providing an alternate AC voltage to an electrical load having a main AC voltage.

Referring now to FIG. 6, a balanced charger flowchart of the system (20) and method of the present invention for providing an alternate AC voltage to an electrical load having a main AC voltage is shown, denoted generally by reference numeral 108. As seen therein, once every second, if more than one charger is present (110), the individual currents of the chargers are read (112) and the chargers are balanced by decreasing the output voltage of the high charger (114).

Thereafter, the individual currents of the chargers are again read (116) and summed (118). If that sum is not within battery charging specifications (120), then all chargers are changed by the same voltage (122) in the direction necessary to balance the individual charger currents. Subsequently, the individual currents of the chargers are again read (116) and summed (118), and that sum is again checked to determine if it is within battery charging specifications (120).

Figure 7A:
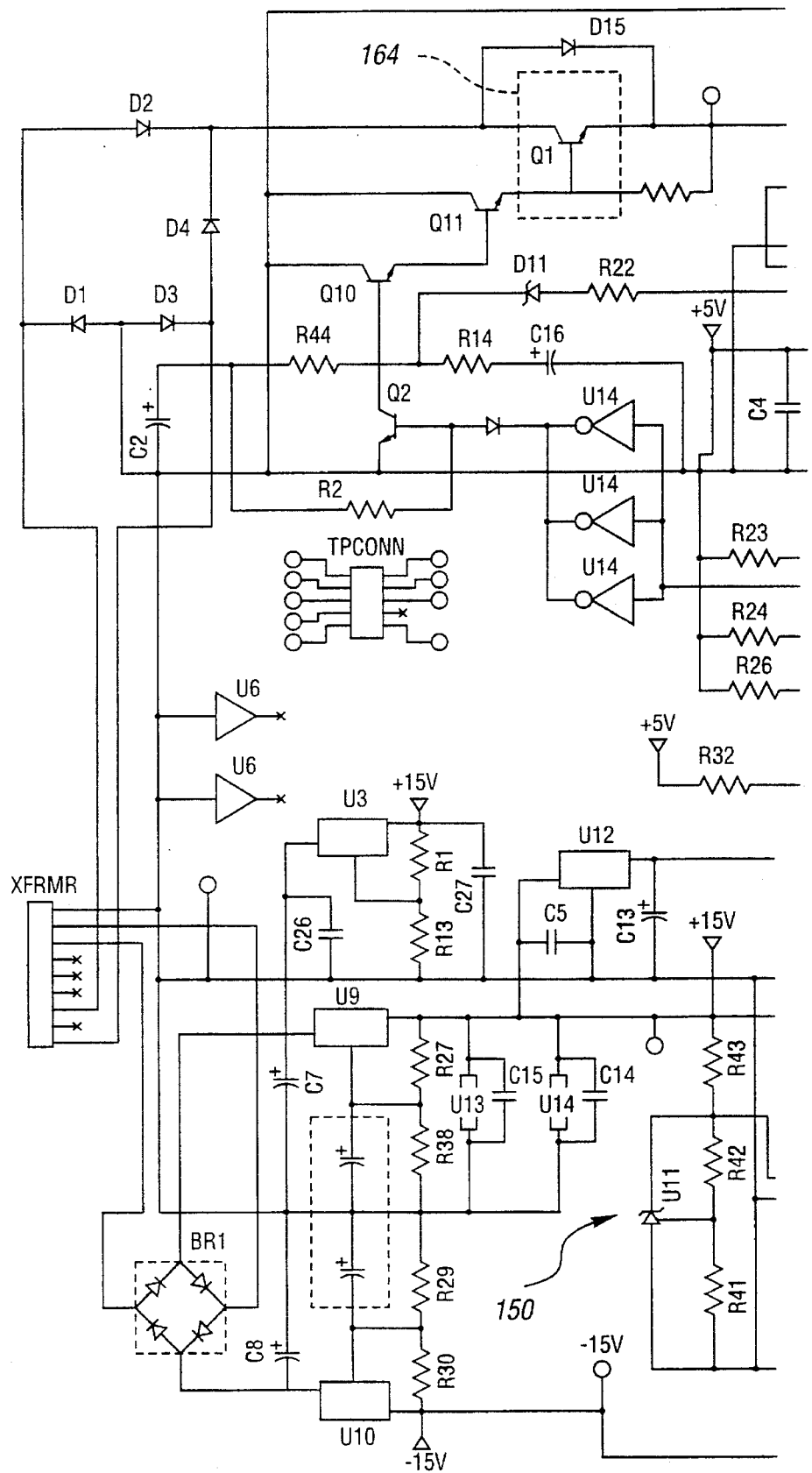
FIG. 7 is a detailed schematic of the charger circuit of the system of the present invention for providing an alternate AC voltage to an electrical load having a main AC voltage.
Figure 7B:
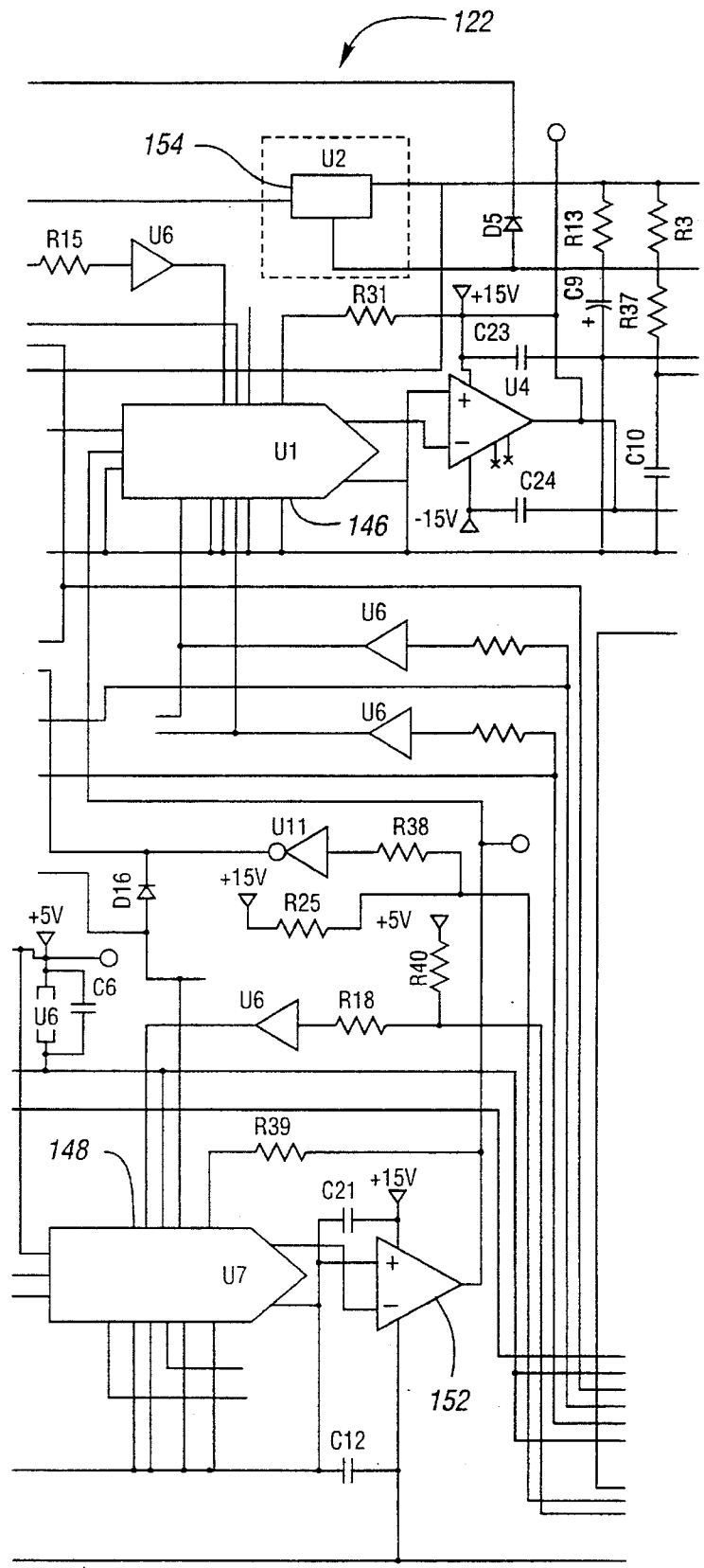
Figure 7C:
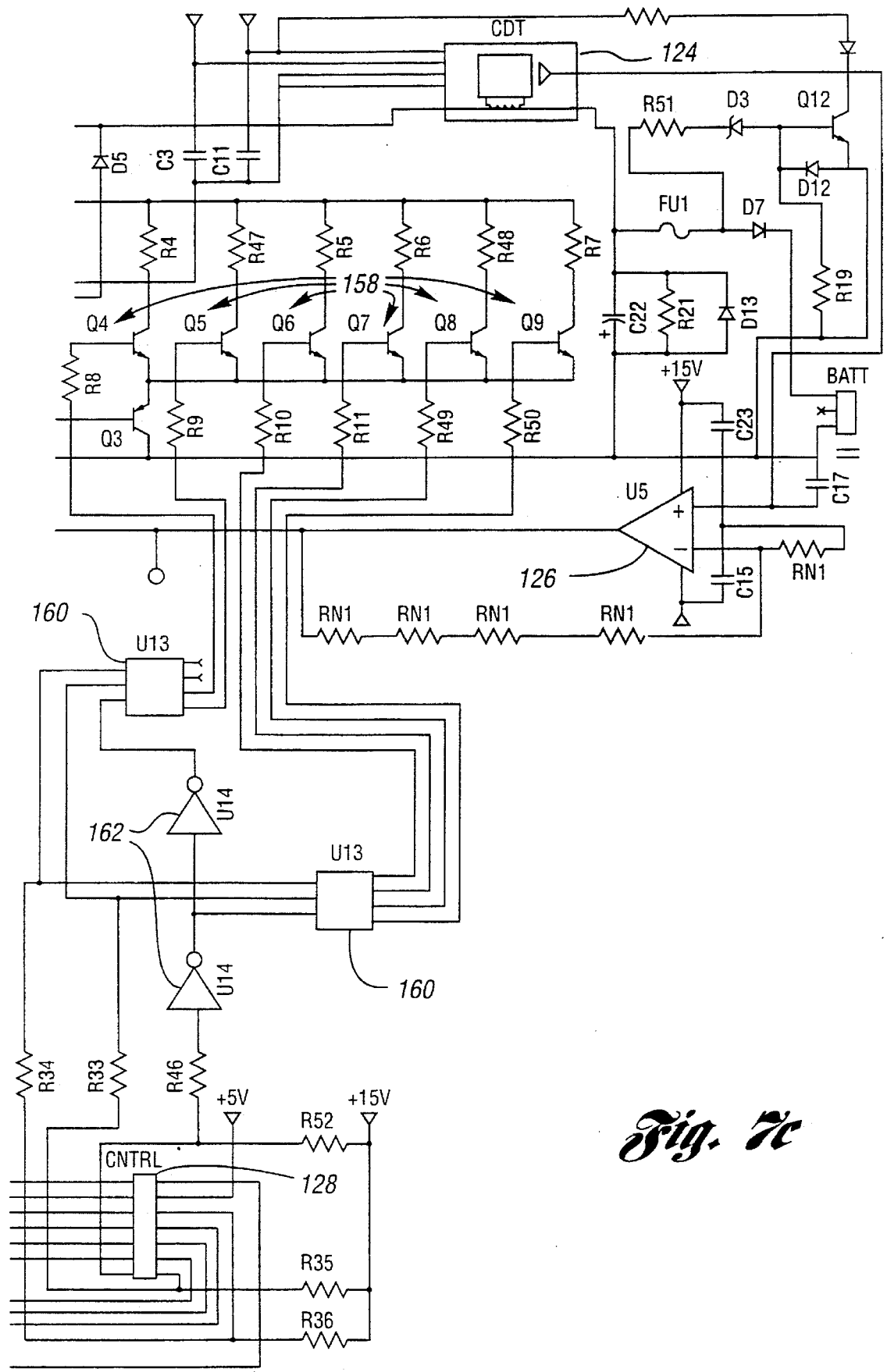

Referring now to FIG. 7, a detailed schematic of the charger circuit of the system (20) of the present invention for providing an alternate AC voltage to an electrical load having a main AC voltage is shown, denoted generally by reference numeral 122. Operation of the circuit is as follows, with further reference to FIGS. 2, 4(a), 4(b) and 4(c). For the purpose of this discussion, the operation of only one charger is detailed. In a typical application, two to four chargers would be involved.

Charger control is done through routines in the microprocessor software that monitor individual charger currents and instruct the charger how to change its output voltage to alter the current it is supplying. The system (20) and method of the present invention generate charger current signals as follows.

On the charger circuit board (122), Hall effect transducer CD1 (124) outputs a DC signal on pin 5 proportional to the output current of the individual charger. It is then passed to scaling amplifier U5 (126) that changes the signal to a 0–5 volt level that is passed to the microprocessor via the CNTRL connector (128), pin 12. On the controller board (28c), the DC signal is routed to unity gain isolation amplifier U23 (130) (U25, U27 and U29 for other chargers) and then to controller board (28a) at pin 4 (pins 5, 6, 7 and 8 for other chargers) of U56 (132), a 12 bit analog-to-digital converter that can be read by microprocessor (28).

Once microprocessor (28) reads the individual charger currents, it must be able to communicate with the chargers (32) to correct any differences in their operation. This is accomplished by U1 (84) outputting digital charger control signals via latches U4 (134) and U5 (86) to drivers U44 (136) (for charger 1) and U45 (138) on controller board (28c). The control signals are then fed to opto-isolators U21 (140) and U22 (142) (for charger 1) (U31, U32, U33, U34, U35 and U43 for additional chargers), and to the CHGRn connectors (CHGR1 (144) for charger 1).

The charger is a variable voltage regulator device that charges a wide range of battery voltages, approximately 20 to 110 volts. It uses two digital to analog converters (DAC) on the charger board, U1 (146) and U7 (148). DAC U7 (148) supplies a variable reference voltage for DAC U1 (146) that sets the usable span of DAC U1 (146) within the battery voltage range of the system (20) configuration. DAC U7 (148) generates this variable reference through the use of a fixed reference voltage generated by U11 (150) and offset commands issued by microprocessor U1 (84) from controller board (28b) over pins 7, 8 and 9 on the CNTRL connector (128).

This signal is passed through buffer amplifier U8 (152) to the reference pin of DAC U1 (146). This variable reference is offset by commands from microprocessor U1 (84) from controller board (28b) over pins 5, 7 and 9 on the CNTRL connector (128). The offsets generated by DAC U1 (146) are used for fine control of the output voltage to compensate for float voltage differences due to ambient temperature variations.

U2 (154) is the main output voltage regulating device that is controlled by DAC U1 (146) through buffer amplifier U4 (156) and a series of transistors, Q4 through Q9 (158), that select the correct resistance scaling for the regulator U2 (154). The correct resistor choice from R4, R47, R5, R6, R48 and R7 is controlled by microprocessor (84) from controller board (28b), depending on the number of batteries present.

The above described control of transistors Q4 through Q9 is initiated by U1 (84) through latch U5 (86), pins 5, 6 and 9 (MS0–MS2). These digital signals are put through driver U44 (136) from controller board (28c) and applied to MS0'–MS2' to opto-isolators U21 (140) and U22 (142) which put their signals onto the CHGR1 connector (144) pins 6, 13 and 14. On the charger board (122), these signals are decoded by U13 (160) and U14 (162) to control the transistor necessary to accomplish the scaling. In addition transistor Q1 (164) is a helper device that prevents U2 (154) from dissipating excessive power by keeping the voltage thereacross at a low level through all input voltages.

Referring again to FIG. 1, as the system (20) and method of the present invention utilize microprocessor control, the microprocessor (28) must run off the batteries (22) supplying alternate power. Microprocessor (28) cannot be run from the utility power since control must be maintained when utility power fails. However, one of the most troublesome maintenance problems for the system (20) and method of the present invention is the failure of the main batteries (22) due to deep discharge and poor maintenance. Many of the maintenance problems are minimized by other features of the present invention and its extensive monitoring capabilities, which are discussed in greater detail below.

However, if the system (20) and method of the present invention are left without utility power for an extended period of time, the microprocessor (28) drain on the batteries (22) will eventually discharge the batteries (22) to the point of damage. This may take weeks or months, but the damage is irreversible and the batteries must be replaced, which is an expensive proposition.

The automatic shutdown feature of the present invention solves this problem by disconnecting the main batteries from all loads if the battery voltage drops to 87.5% of nominal. This is the point recommended by battery manufacturers as the minimum voltage for discharge. The microprocessor (28) constantly monitors the battery voltage as part of its normal operation and, when it measures the potential as reaching the minimum point, it records the event, outputs out a message, and trips all the circuit breakers connected to the batteries (22).

However, the microprocessor (28) does not undertake an automatic shutdown if the station is in service mode, under battery charge, or the inverter (26) is running. In these cases, reduction of the battery voltage below the 87.5% level is due to extraordinary circumstances (i.e, main voltage has failed), or will trigger a different type of alarm.

Figure 8:
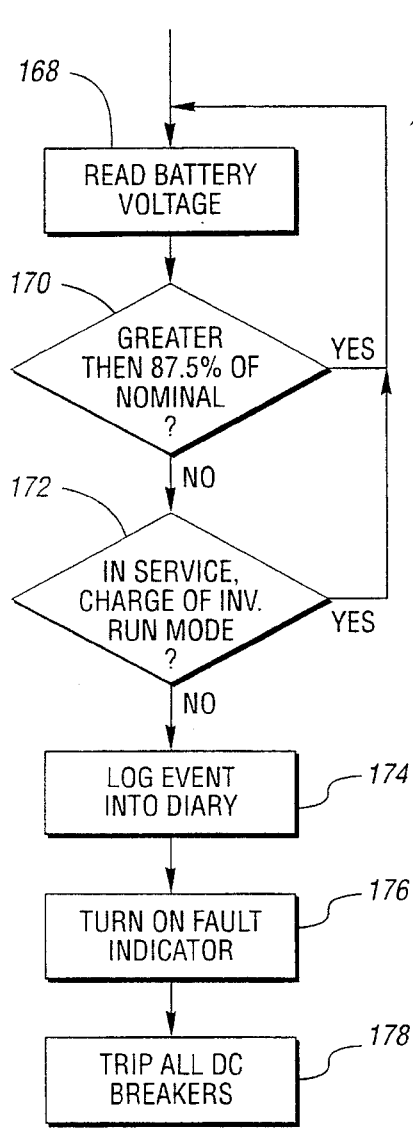
FIG. 8 is a shutdown flowchart of the system and method of the present invention for providing an alternate AC voltage to an electrical load having a main AC voltage.

Referring now to FIG. 8, a shutdown flowchart of the system (20) and method of the present invention for providing an alternate AC voltage to an electrical load having a main AC voltage is shown, denoted generally by reference numeral 166. As seen therein, battery voltage is continually read (168). If that voltage is less than 87.5% of nominal (170) and the system (20) and method of the present invention are not in service mode, under battery charge or running the inverter (172), then the event is recorded (174), an error is indicated (176) and all breakers are tripped (178).

Referring again to FIGS. 2, 4(a), 4(b) and 4(c), the hardware that supports this feature is shown. The system (20) and method of the present invention generate a DC voltage signal representing the magnitude of the DC voltage supplied by the DC power source, compare the DC voltage signal to a reference value, and generate a DC power source control signal operative to isolate the DC power source when the DC voltage signal is less than the reference value and the status signal indicates that the main AC voltage is active as follows.

In general terms, the microprocessor (28) outputs a DC signal to the trip coils (180) built into the each of the breakers feeding the battery (22). More specifically, microprocessor U1 (84) outputs a trip signal out of latch U5 (86) to opto-couplers U62 (182), U30 (184) and U65 (186). Each of these opto-couplers controls a driver transistor, Q7 (188), Q9 (190) and Q10 (192), which connect to one of the DC breakers (either controller power, charger, or inverter breaker).

The breakers are connected to the opto-couplers through BREAKER connector (194), pins 9, 10 and 11. For example, the breaker that supplies power for the microprocessor (28) would be tripped by a signal generated by the output from controller board (28b) on latch U5 (86), pin 15, which is fed to trip controller U62 (182) on controller board (28a) and then driver transistor Q7 (188). Transistor Q7 (188) then applies voltage to BREAKER connector (190) pin 9, where it causes the trip coil on the breaker to open the battery circuit. Normally, all three breakers would be tripped simultaneously by the microprocessor (28).

The system (20) and method of the present invention also have a set of software routines that interact with the hardware during the first installation and activation thereof. The software leads an installer through a series of steps that allows the hardware to check conditions within itself and the set-up of the machine, such as proper wiring to outside circuits. Besides being able to do internal testing, this setup, or commissioning process checks for proper input voltage, proper wiring of the output circuits and correct battery wiring.

To accomplish this process, the software utilizes the capability of the system (20) to read the utility voltage, the output voltage of the station, the battery voltage, and the capability to sense if certain circuit breakers are either closed or open. By checking for the outlined operations, the probability that the hardware will be wired properly is greatly increased, with a corresponding decrease in the probability that the hardware will experience a serious failure when installed.

Figure 9A:
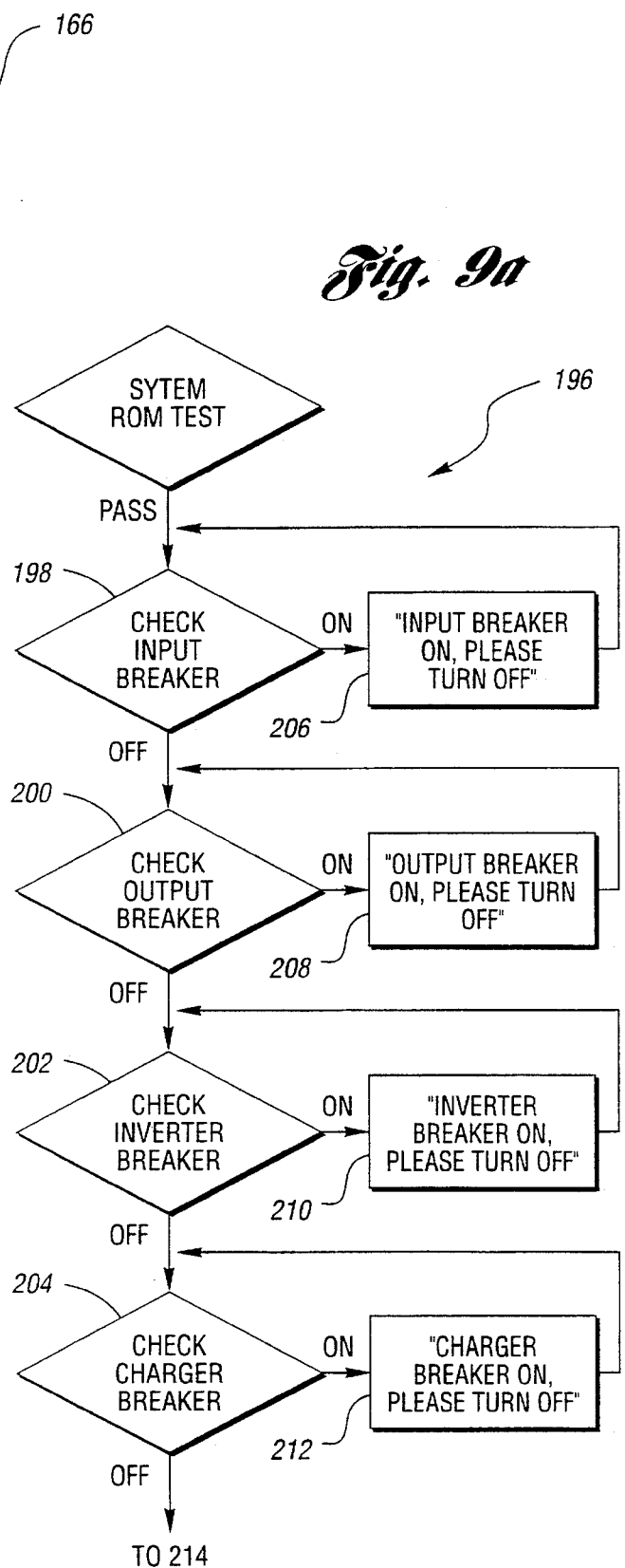

Referring, then, to FIGS 9a–d, a setup flowchart of the system (20) and method of the present invention for providing an alternate AC voltage to an electrical load having a main AC voltage is shown, denoted generally by reference numeral 196. As seen in FIG. 9a, therein, during hardware installation, each one of an input breaker, output breaker, inverter breaker and charger breaker are checked (198, 200, 202, 204). If any of these breakers are on, a message is output to the installer to turn the appropriate breaker off (206, 208, 210, 212).

Figure 9B:
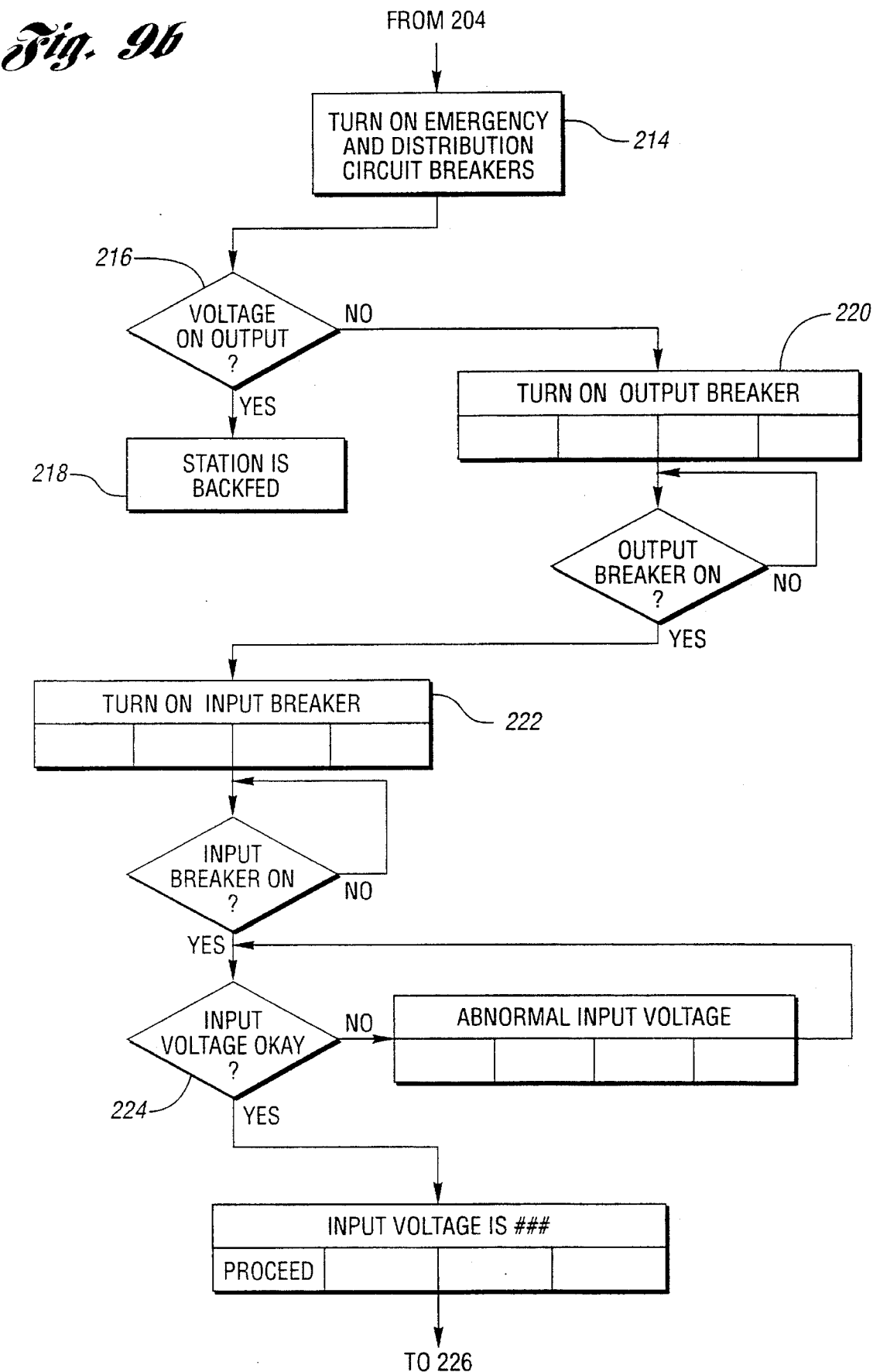
Figure 9C:
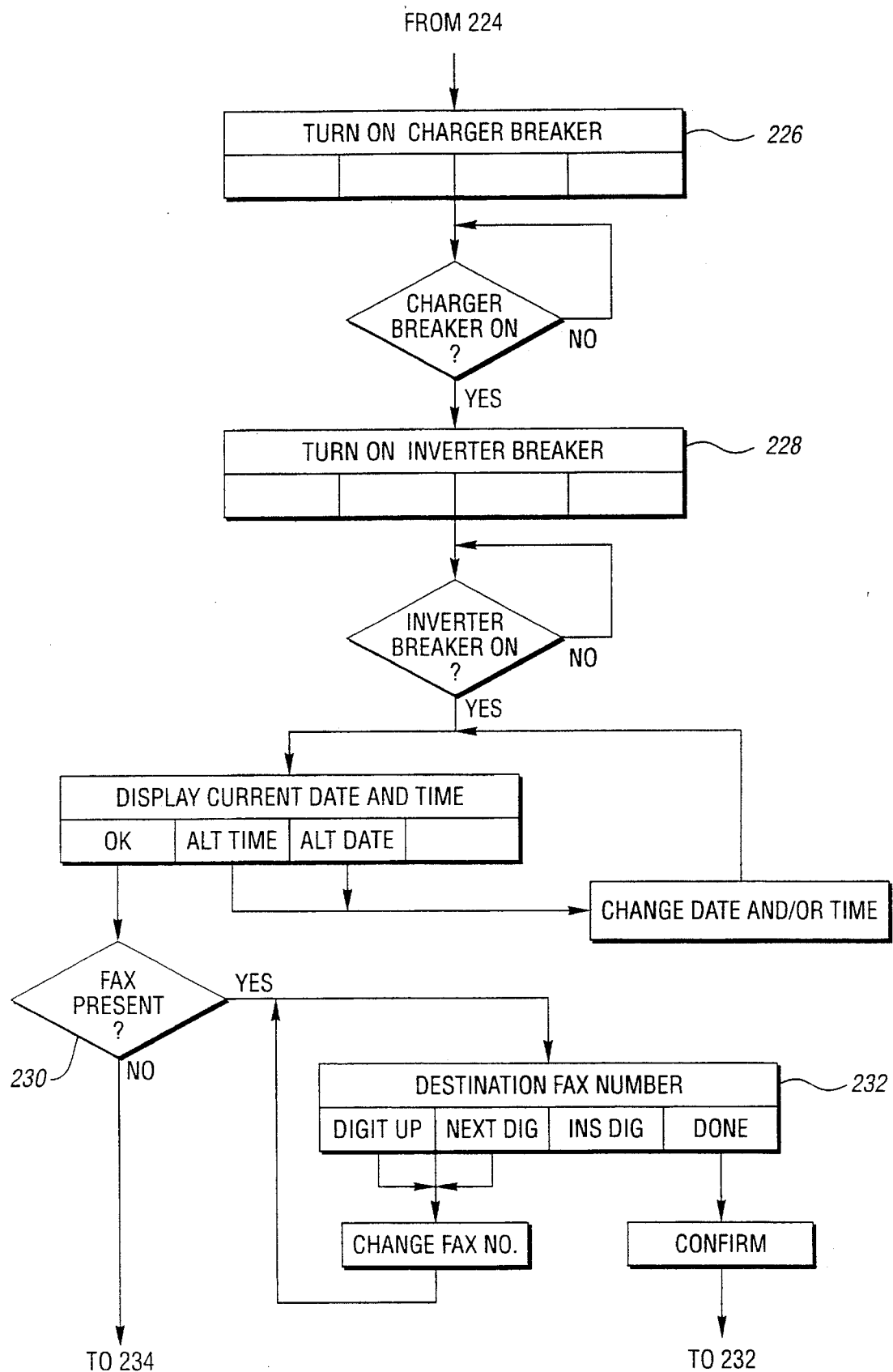
Figure 9B:
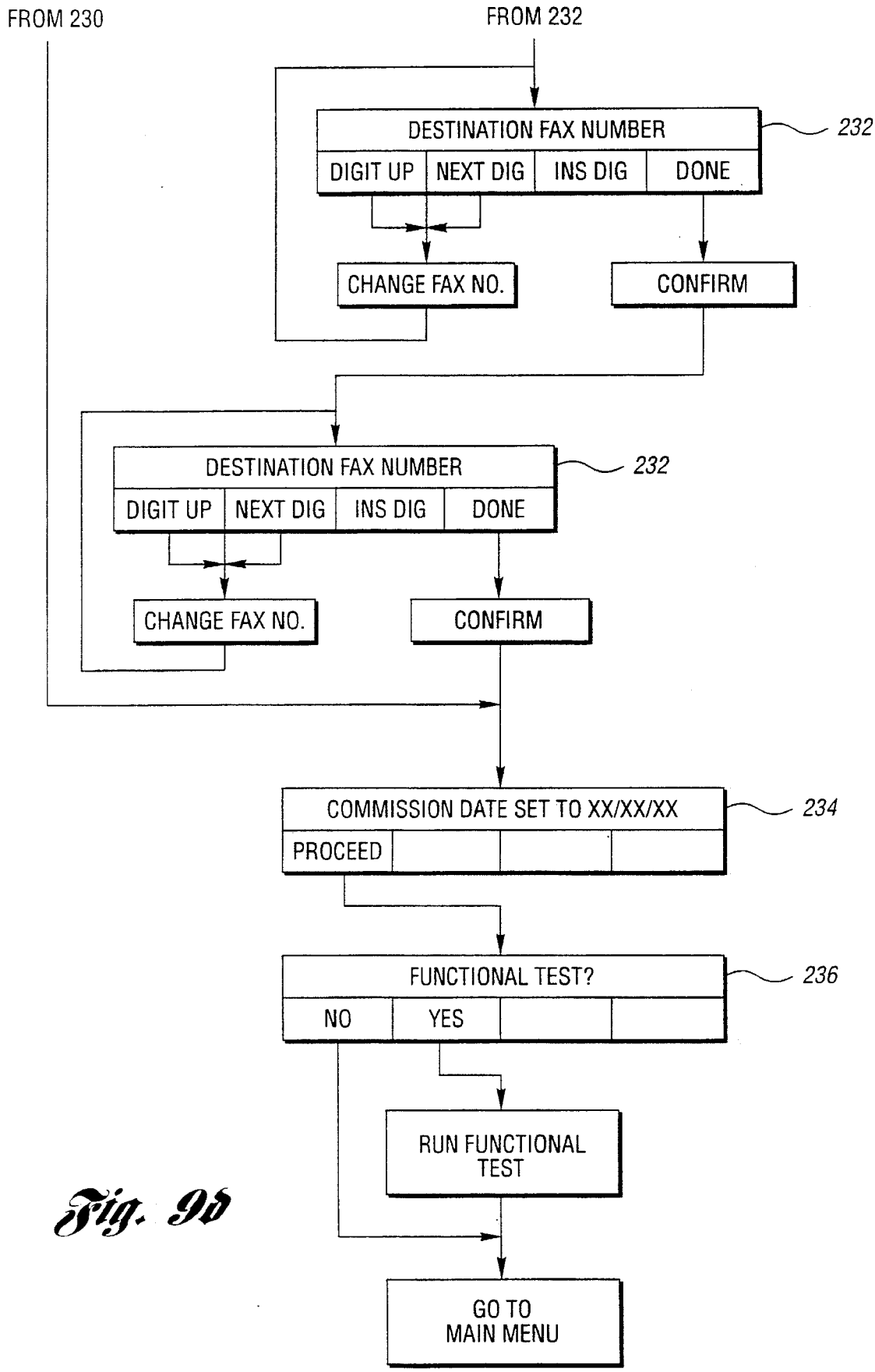

Subsequently, as seen in FIG. 9b, emergency and distribution breakers are turned on (214). Thereafter, in the event that voltage is present on the system (20) output (216), a backfeed message is outputted to the installer (218). Otherwise, the installer is instructed to turn on the output and input breakers, respectively (220, 222). Once those breakers are turned on, the input voltage is checked (224) and, if normal, the installer is instructed to turn on the charger and inverter breakers, respectively (226, 228), as seen in FIG. 9c.

Thereafter, if a fax machine is present (230) in the system (20) (described in greater detail below), the installer is instructed to input a destination fax number (232). If not, as seen in FIG. 9d or after having done so, the installer is instructed to enter a commissioning date (234) and is given an opportunity to perform a functional test (236).

Referring again to FIGS. 2, 4(a), 4(b), 4(c) and 5, the hardware relating to such commissioning is shown. As seen therein, breaker status is sensed through a set of contacts (240) mounted on the breakers that mimic the open and closed condition of the main contacts. These contacts are fed through opto-isolator U63 (244) on the controller board (28a). There are multiple breakers monitored simultaneously, but one example of the operation is the output breaker (382), whose sense contacts are fed to controller board (28b) through the breaker connector (194) pin 6. The signal is fed to U63 (244) on pin 1 and output on pin 15. The isolated signal is connected to buffer chip U20 (246), pin 18, on controller board (28b) which is read over the digital bus by microprocessor U1 (84). All other breakers are sensed in a similar manner, although the pins and connector locations vary.

The battery voltage is brought into the transfer board (70) on the BATT connector (248) and passed through surge protector R8 (250), filter inductor L6 (252) and resistor R12 (254). Resistor R12 (254) is a current limiting resistor and forms half of a voltage dividing network. The signal is passed to controller board (28a) via the controller connector (74), pin 15.

The other half of the voltage divider is shown on controller board (28c) and is composed of resistors R43 through R48, one of which is chosen by transistors Q1 through Q6. One of these transistors Q1 through Q6 is turned on to divide the battery voltage down to the proper level to be passed through RMS converter U41 (256) and negative overshoot protector U37 (258), which produces 0–5 volts on output pin 7. This voltage goes to U56 (132) from controller board (28a), a 12 bit analog-to-digital converter for high resolution of the battery voltage reading. (U56 (132) also inputs the charger current and battery temperature signals). The digital signal produced by U56 (132) is read serially by microprocessor U1 (84) from controller board (28b).

The proper attenuator transistor (Q1–Q6) is chosen through setting of latch U5 (86) pins 5, 6 and 9. These digital signal are fed to driver U44 (136) on controller board (28c), pins 4, 5 and 8, which drive isolators located in U66 (260). These signals are decoded by U40 (262) to drive the proper transistor (Q1–Q6) to provide the needed voltage divider effect to scale the battery voltage to the proper input range for the RMS converter U41 (256).

The output voltage sense, which is used during commissioning to determine if voltage is backfed from an erroneous connection of an output circuit to a live circuit, is brought into the transfer board (70) on TS1 and fed to a step-down transformer through TSEC connector (264). The actual connection depends on whether 120 or 277 volts is present on the output circuit. The output of the transformer is fed to the controller through the CONT1 connector (74).

On controller board (28a), the voltage on pin 19 of the TRANSFER connector (76) is fed to an RMS converter U48 (266), which converts the low voltage AC into a DC level proportional to the true RMS value of the AC signal. AC overvoltage protection is provided by variable resistor (varistor) V2 (268). The DC signal is fed to U47 (270), which sets the proper DC differential level to the signal to allow proper interpretation of the level by microprocessor (28). This DC signal is passed through U49 (272), which isolates the RMS converter circuitry from the digital section of the microprocessor (28). The DC output of U49 (272) (labeled AC_OUT) is fed into pin 47 of microprocessor U1 (84) on controller board (28b) which can read the DC level that represents the level of the AC output voltage.

During the commissioning process, the time and date can be altered to match the time zone in which the equipment is installed. The date and time are altered through prompts on the display (36) and entries through the keypad (34). The commissioning process also checks the input voltage to ascertain if it is within the tolerance of the station as manufactured. A description of the hardware used in this process is presented above with respect to the user selectable delay feature.

The system (20) and method of the present invention also comprise an internal memory, or diary. The internal memory is designed to log all significant events for later recall and review. All faults, warnings, automatic testing, manual testing, excursions into emergency mode, the accumulated time the system (20) is above its rated temperature, as well as the date and time are recorded via unique code numbers to conserve storage space.

The internal memory is a two lead device that stores data via a 1 bit protocol. Significant events are stored as event information signals in a specific memory location in the device as the number of seconds from a predetermined point in time. Event information signals may include breaker error signals, transfer indication signals, DC power source capacity signals, DC voltage error signals, and back-feed error signals.

Each significant event is recorded with a time and date stamp showing the beginning and end of the occurrence so the exact timing of events can be ascertained at recall. The internal memory also contains an internal clock and 10 year back-up battery. With the events recorded as two digit code keys with a time stamp, 90 events can be stored before the oldest information is overwritten with new data.

The record of data provides the owner with a history of the operation of the system (20) and method of the present invention, including when power failures occurred, and provides the manufacturer with information pertinent to the warranty. For example, if the station has been subjected to excessively high or low temperatures, or the battery has not been properly maintained, unfounded warranty claims can be avoided.

Figure 10A:
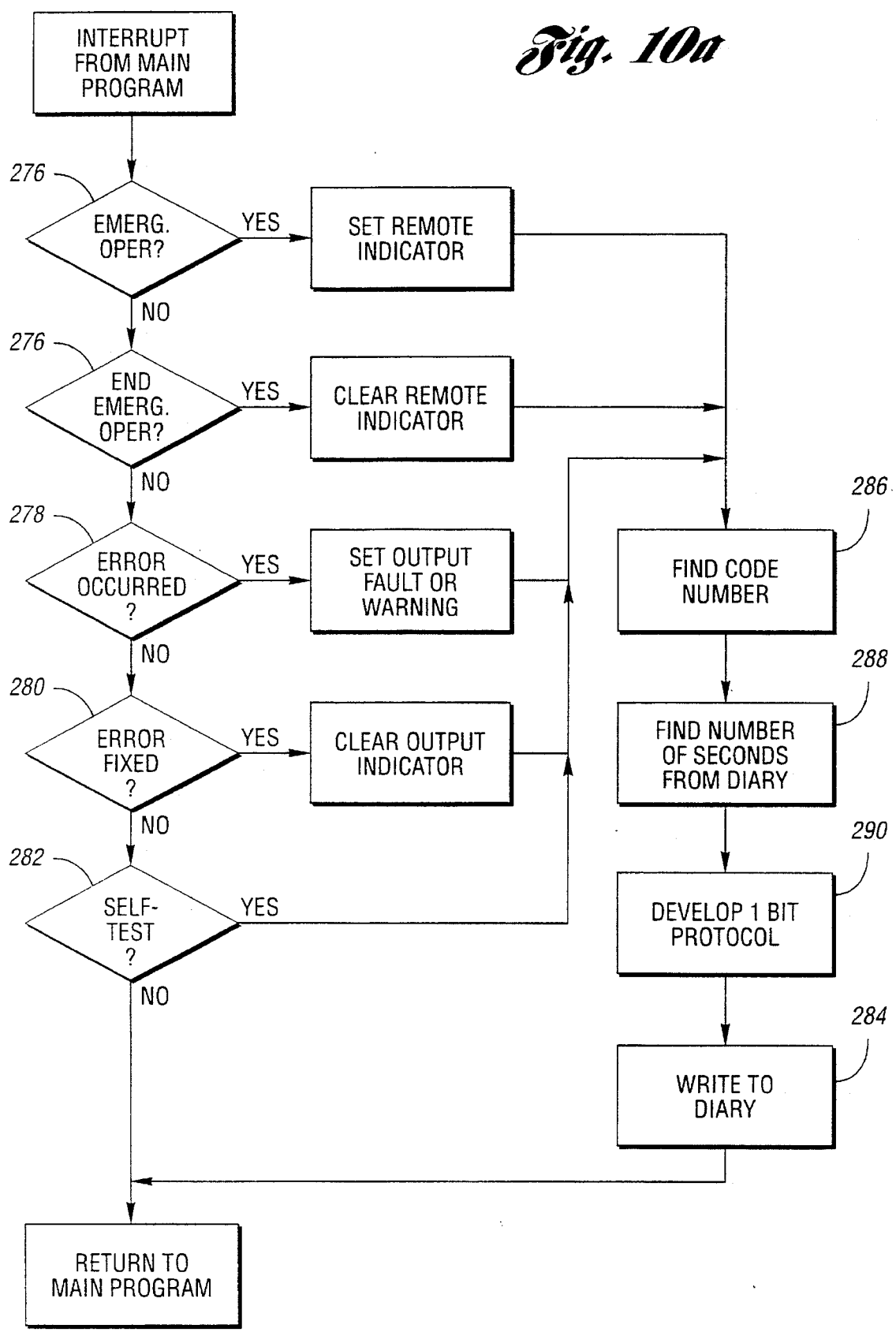
FIGS. 10(a) and 10(b) are internal memory flowcharts of the system and method of the present invention for providing an alternate AC voltage to an electrical load having a main AC voltage.
Figure 10B:
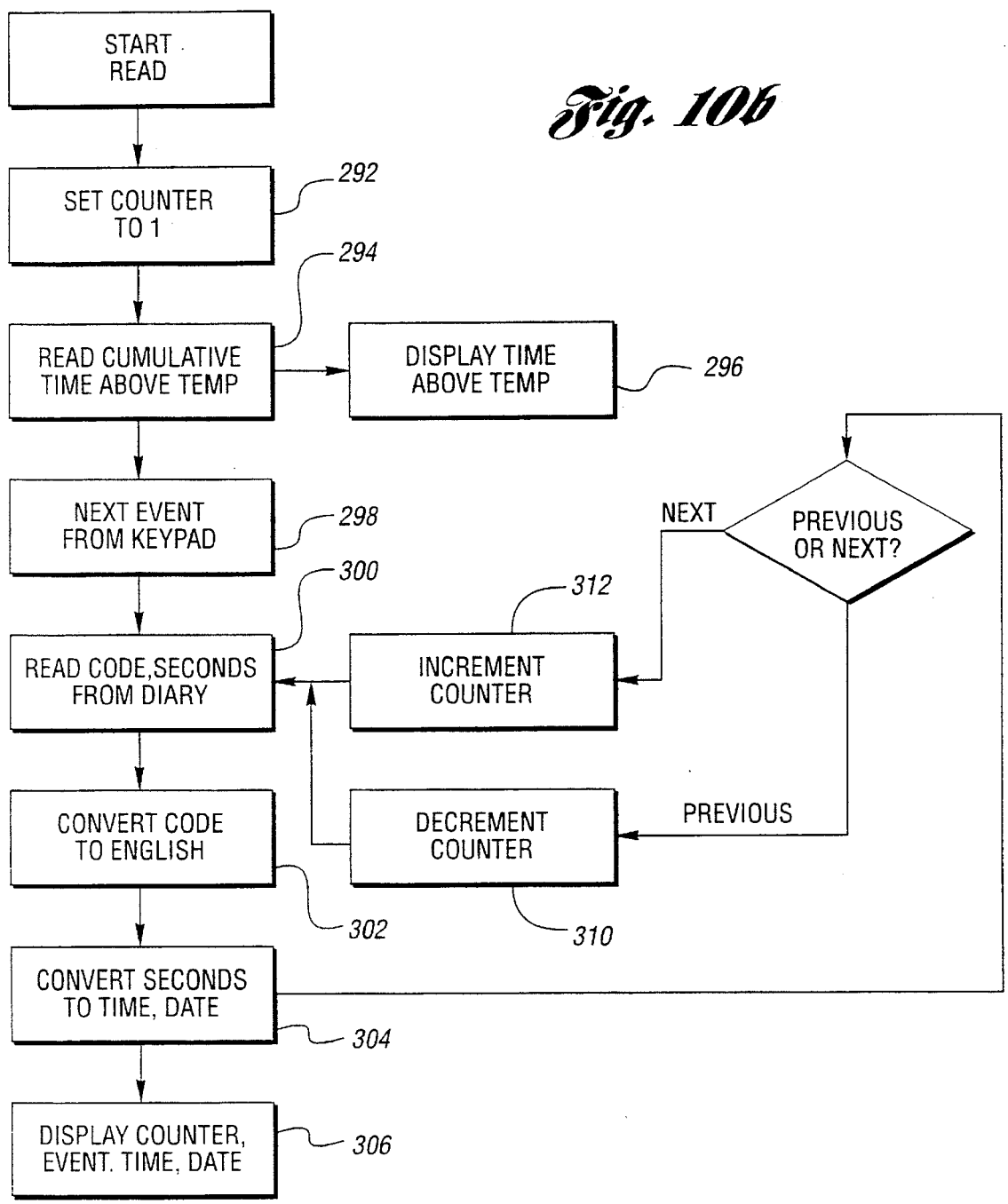

Referring, then, to FIGS. 10(a) and 10(b), internal memory flowcharts of the system and method of the present invention for providing an alternate AC voltage to an electrical load having a main AC voltage are shown. More specifically, FIG. 10(a) shows how information is written to the diary, while FIG. 10(b) shows how information is read from the diary.

As seen in FIG. 10(a), whenever emergency operation begins or ends (274, 276), an error is detected or corrected (278, 280), or a self-test is performed (282), the event is written to the diary (284). This is accomplished by first locating a code number (286), determining the number of seconds from a predetermined point in time (288), and developing a 1-bit protocol (290).

As seen in FIG. 10(b), information is read from the internal memory by first initializing a counter (292). Next, the cumulative time above rated temperature is read and displayed (294, 296). Thereafter, the user may select an event on which information is desired (298). That event code and number of seconds from a predetermined point in time are read (300), converted (302, 304) and displayed (306) as an output message including time and date. Previous or subsequent events may then be read similarly by decrementing or incrementing the counter (308, 310, 312).

Referring again to FIG. 4(b), operation of the internal memory hardware is as follows. The diary (314) is connected directly to the microprocessor U1 (84) via pin 27, where digital read/write signals are communicated between the two devices. Since the diary (314) is a two-terminal device, all communication is serial, one bit at a time.

Referring again to FIGS. 2 and 4(b), in addition to the display (36), the system (10) and method of the present invention may also output various event information signals via a fax machine or fax-modem (316) to provide the owner with immediate written records of events. These events include any faults or warnings indicating hardware problems, transfer to and back from alternate power operation, and results of self-tests, either self-triggering from periodic software direction or initiated by a telephone request. Microprocessor (28) communicates with the fax-modem (316) through the MODEM connector (318) on controller board (28b).

The fax modem (316) and its associated control circuitry are preferably provided as disclosed in a co-pending application entitled "Data Telemetry System And Method" filed the same day as and assigned to the same assignee as the present application, which is hereby incorporated by reference. Generally, however, the fax modem (316) comprises an internal memory for storing various forms. When an event occurs that needs to be transmitted via fax machine, microprocessor (28) sends the data to the fax-modem (316), where it is placed in the proper form, converted into fax format, and sent to the fax telephone numbers stored in memory during the commissioning process described above. The forms used for transmission are predetermined. Each fax is also labeled at the top of the form with the phone number from which the fax originated. This number is entered by the user during commissioning as required by federal law.

Figure 11:
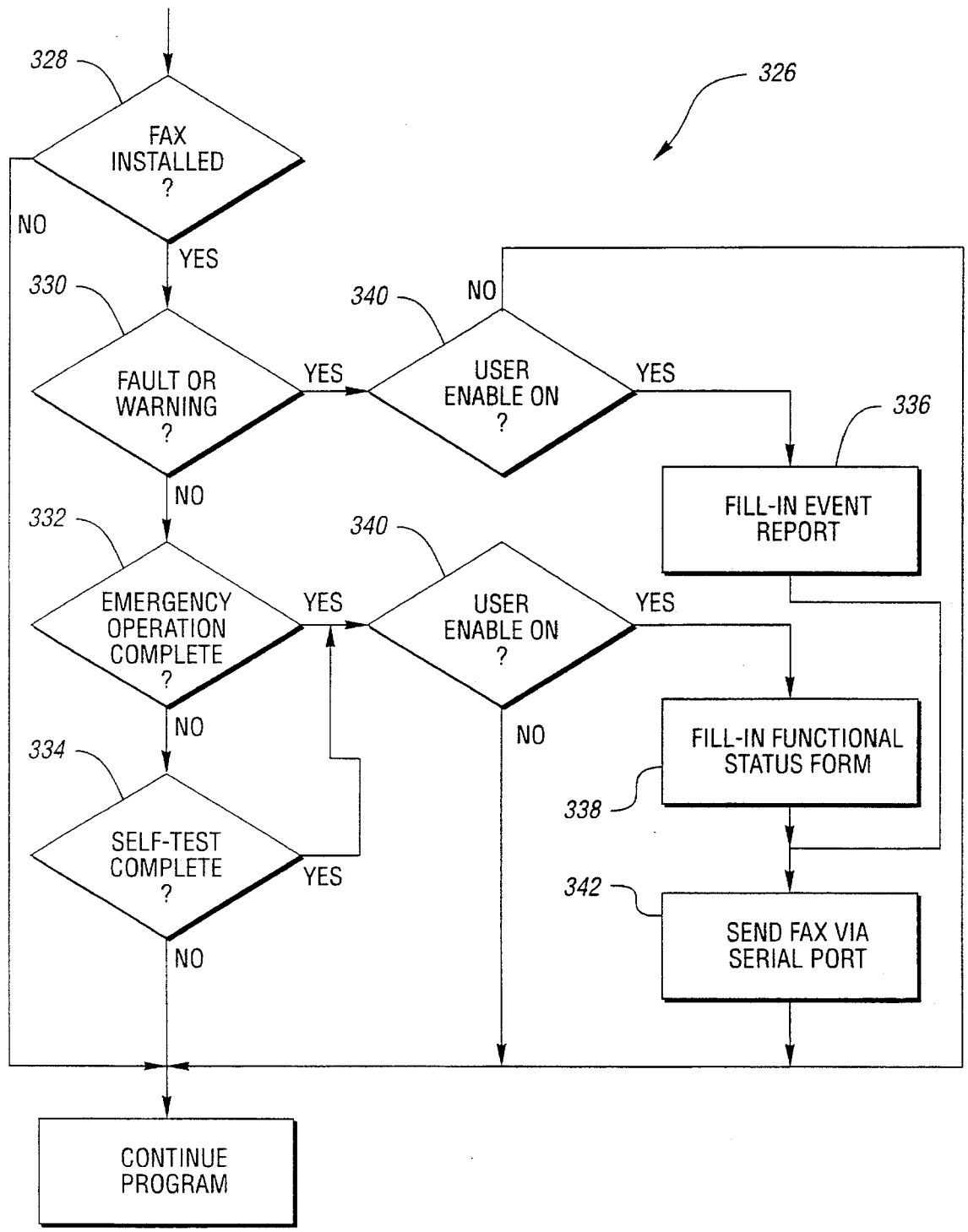
FIG. 11 is a fax flowchart of the system and method of the present invention for providing an alternate AC voltage to an electrical load having a main AC voltage.

Referring, then, to FIG. 11, a fax flowchart of the system (20) and method of the present invention for providing an alternate AC voltage to an electrical load having a main AC voltage is shown, denoted generally by reference numeral 326. As seen therein, assuming a fax machine is installed (328), where a fault or warning is generated (330), an emergency operation is completed (332), or a self-test is completed (334), the proper output form is completed (336, 338) when the user enable is on (340), and a fax transmission is sent (342) via the serial port of the microprocessor.

Referring again to FIGS. 2 and 4(b), the hardware that interfaces with the fax-modem (316) operates as follows. On controller board (28b), the fax-modem (316) is connected via the MODEM connector (318), and sends and receives serial communication data via pins 2 and 3. Integrated circuit U9 (320) converts RS-232 serial information into TTL logic and back to allow communication with the microprocessor U1 (84). There are two serial ports on the controller board (28b), the second of which, SETUP (321), is used for factory set-up communication.

However, the microprocessor U1 (84) has capability for communicating with only one serial port. A switching arrangement is therefore utilized that allows the microprocessor U1 (84) to switch itself between the two ports. U1 (84) sends a signal out through latch U6 (100), pin 12, labeled COM_SW. This signal is routed to U18 (322) and U24 (324) such that only one transmit and receive line is active at one time, making only one port active. When the MODEM port (318) is selected, the transmit and receive lines, pins 11 and 12 of U9 (320), travel through U18 (322) to the TXD and RXD lines of U1 (84) on pins 20 and 21, completing the communication link between U1 (84) and the fax-modem (316).

Referring once again to FIGS. 1 and 2, during the time the system (20) and method of the present invention are supplying power from the battery (22), the user would benefit from knowing how much of the battery capacity is remaining and how much time is left before the battery (22) will not supply power. Such information will help the user asses how any evacuation of the facility and shutdown of equipment may need to be handled.

Thus, using microprocessor (28), the system (20) and method of the present invention determine remaining battery capacity and time left from the battery voltage and the time characteristics of the battery discharge current. The specific battery type used in the system (10) and method of the present invention is characterized for its loaded voltage under constant power dissipation conditions. Constant power curves are used since the system (10) and method hold a constant output voltage and thus a constant load as the battery (22) is discharged.

Figure 12:
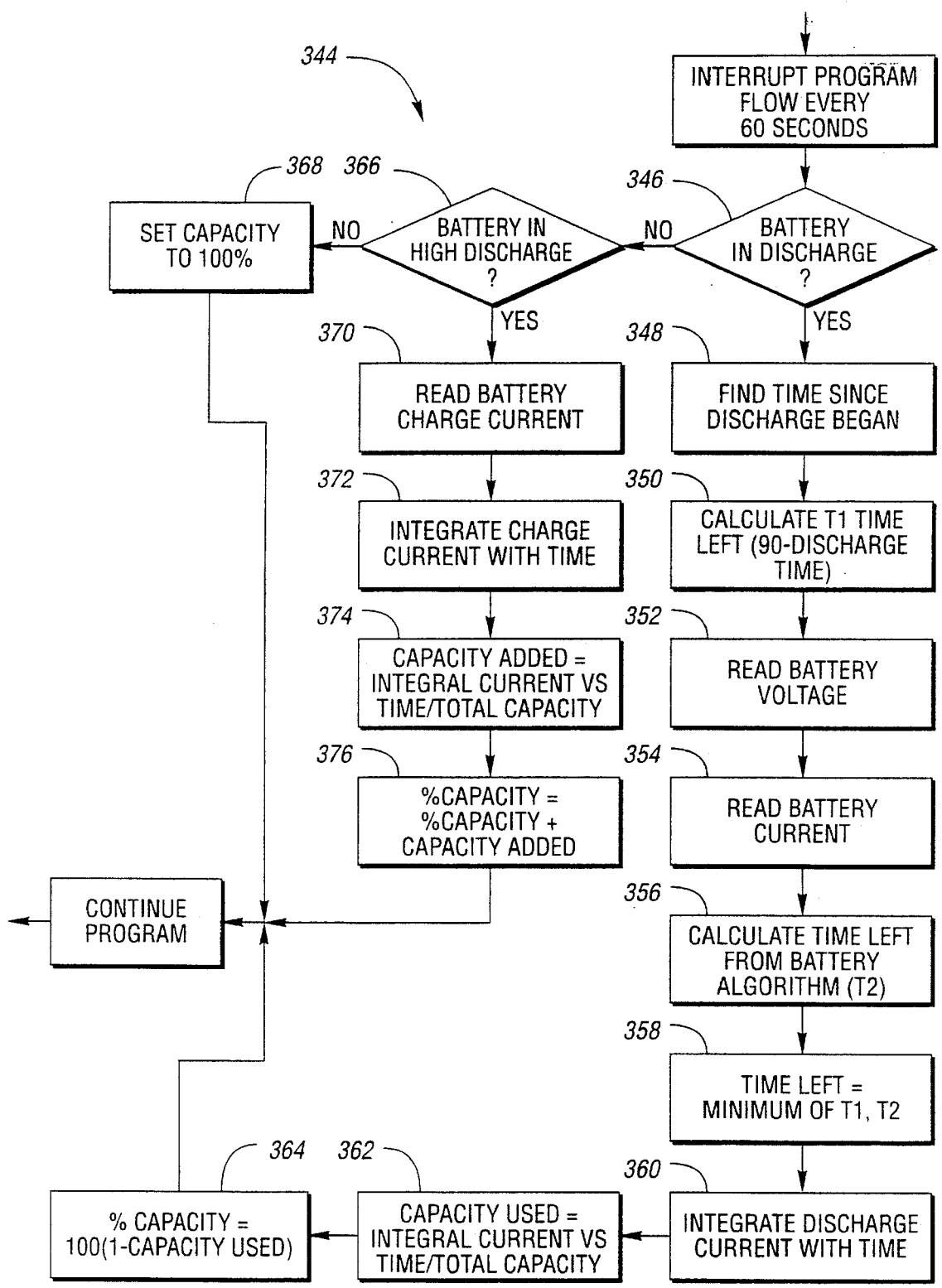
FIG. 12 is a battery monitoring flowchart of the system and method of the present invention for providing an alternate AC voltage to an electrical load having a main AC voltage.

Referring now to FIG. 12, a battery monitoring flowchart of the system (20) and method of the present invention for providing an alternate AC voltage to an electrical load having a main AC voltage is shown, denoted generally by reference numeral 344. As seen therein, once every minute the battery is checked to determine if it is in discharge (346) and, if so, the time since discharge began (348) is subtracted from 90 minutes to determine a first battery time left (T1) (350). Thereafter, battery voltage and current are determined (352, 354) and a second battery time left (T2) is determined from a battery characteristic algorithm (356). The actual battery time left is then taken as the minimum of T1 and T2 (358).

Next, the discharge current is integrated (360) with time and a battery capacity used is calculated from this integral current divided by the total capacity (362). Remaining battery capacity is thereafter determined by subtracting the capacity used from one, and multiplying by 100 to convert to a percentage (364). A DC power source capacity signal is then output representing the DC power source capacity and, preferably, the battery time left, each as determined above.

However, if the battery is not in discharge (346), the battery is then checked to determine if it is in high charge (366) and, if not, battery capacity is set at 100% (368). If, however, the battery is in high charge, then the battery charge current is read (370) and integrated with time (372). An added battery capacity is then determined from this integrated current divided by total capacity (374). Finally, instantaneous battery capacity is calculated from the sum of the previously known capacity and the capacity added (376). Once again, a DC power source capacity signal is then output representing the DC power source capacity and, preferably, the battery time left, each as determined above.

Referring again to FIGS. 2, 4(a), 4(b), 4(c) and 5, the hardware associated with battery monitoring is shown. The system (20) and method of the present invention process the DC voltage signal to determine a DC power source capacity, output a DC power source capacity signal in response to the DC power source capacity determined, and output a DC voltage error signal in response to the DC power source control signal as follows.

The battery voltage is brought into the transfer board (70) on the BATT connector (248) and passed through surge protector R8 (250), filter inductor L6 (252) and resistor R12 (254). Resistor R12 (254) is a current limiting resistor and forms half of a voltage dividing network. The signal is passed to controller board (28a) via the controller connector (74), pin 15.

The other half of the voltage divider is shown on controller board (28c) and is composed of resistors R43 through R48, one of which is chosen by transistors Q1 through Q6. One of these transistors Q1 through Q6 is turned on to divide the battery voltage down to the proper level to be passed through RMS converter U41 (256) and negative overshoot protector U37 (258), which produces 0–5 volts on output pin 7. This voltage goes to U56 (132) from controller board (28a), a 12 bit analog-to-digital converter for high resolution of the battery voltage reading. (U56 (132) also inputs the charger current and battery temperature signals). The digital signal produced by U56 (132) is read serially by microprocessor U1 (84) from controller board (28b).

The proper attenuator transistor (Q1–Q6) is chosen through setting of latch U5 (86) pins 5, 6 and 9. These digital signal are fed to driver U44 (136) on controller board (28c), pins 4, 5 and 8, which drive isolators located in U66 (260). These signals are decoded by U40 (262) to drive the proper transistor (Q1–Q6) to provide the needed voltage divider effect to scale the battery voltage to the proper input range for the RMS converter U41 (256).

The battery current is measured by a Hall effect transducer (378) that encloses the battery lead. The 0–5 volt DC analog signal that is proportional to the battery current is fed to the controller board (28c) on pin 5 of the BAT DIS connector (380). The DC signal is fed to isolation amplifier U36 (382), pin 7, whose output is put on pin 3 of unity gain buffer amplifier U37 (384). The 0–5 volt DC signal is then passed to U56 (132) located on controller board (28a), a 12 bit analog to digital converter which is read serially by microprocessor U1 (84).

Referring again to FIG. 2, a failure of the system (20) and method of the present invention to function may be caused by an open circuit breaker, whether is be tripped by an overload condition or manually switched off. Regardless, an open breaker can create a problem since the system (10) and method must function immediately upon main AC voltage failure.

The system (10) and method of the present invention thus have automatic monitoring of all circuit breakers. If a breaker opens for any reason, an alarm may be sounded and a fax transmission sent. The severity of the error is determined by the type of breaker opened. An open distribution breaker that only handles part of the load will give a warning, since the majority of the load will still be operational. An open charger breaker (380) will also give only a warning since the system (20) and method will still be capable of operation. (If the charger (32) is left off too long, the battery (22) will discharge and a fault error signal will be issued.) However, if the main input breaker (381), main output breaker (382), or inverter breaker (384) is opened, a fault error signal will be issued immediately since none of the loads will be operational.

Figure 13:
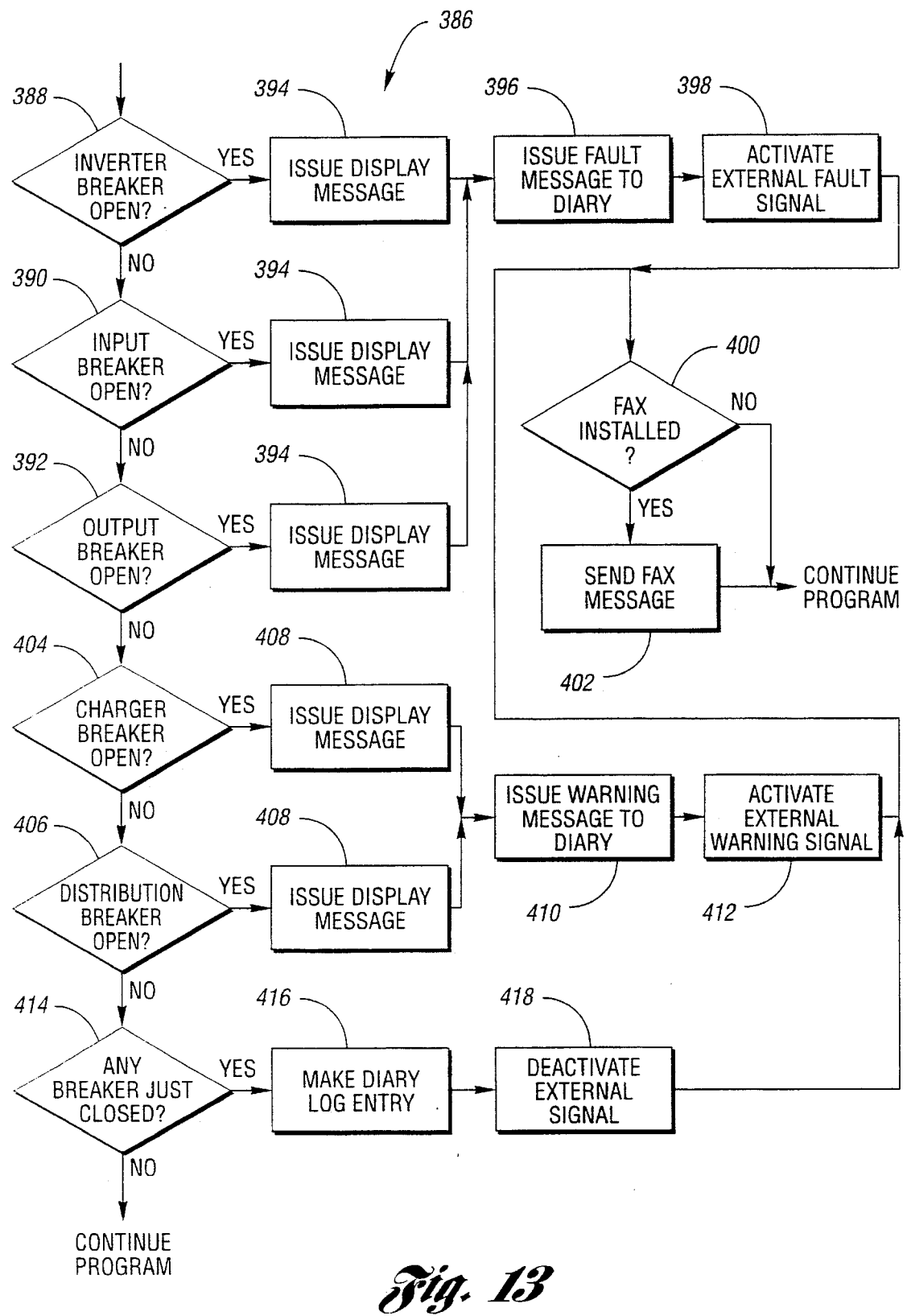
FIG. 13 is a circuit breaker monitoring flowchart of the system and method of the present invention for providing an alternate AC voltage to an electrical load having a main AC voltage.

Referring now to FIG. 13, a circuit breaker monitoring flowchart of the system (20) and method of the present invention for providing an alternate AC voltage to an electrical load having a main AC voltage is shown, denoted generally by reference numeral 386. As seen therein, if the inverter breaker, input breaker, or output breaker is opened (388, 390, 392), then a message to that effect is displayed (394), a fault message is written to the diary (396), and an external fault error signal is issued (398). If a fax machine is installed (400), a fax message regarding the event is also transmitted (402).

If the charger breaker or distribution breaker is opened (404, 406), then a message to that effect is displayed (408), a warning message is written to the diary (410), and an external warning error signal is issued (412). If a fax machine is installed (400), a fax message regarding the event is also transmitted (402). Finally, when any previously open breaker is closed (414), the event is written to the diary (416), and any external error signal is deactivated (418). If a fax machine is installed (400), a fax message regarding the event is also transmitted (402).

Referring again to FIGS. 2, 4(a), 4(b), 4(c) and 5, the hardware relating to such commissioning is shown. The system (20) and method of the present invention output an input breaker error signal when a breaker for selectively isolating a system input is opened, output an output breaker error signal when a breaker for selectively isolating a system output is opened, output a back-feed error signal when the system output is directly connected to the system input, output a charger breaker error signal when a breaker for selectively isolating the means for charging is opened, and output an inverter breaker error when a breaker for selectively isolating the means for inverting is opened as follows.

As seen therein, breaker status is sensed through a set of contacts (240) mounted on the breakers that mimic the open and closed condition of the main contacts. These contacts are fed through opto-isolator U63 (244) on the controller board (28a). There are multiple breakers monitored simultaneously, but one example of the operation is the output breaker, whose sense contacts are fed to controller board (28b) through the breaker connector (194) pin 6. The signal is fed to U63 (244) on pin 1 and output on pin 15. The isolated signal is connected to buffer chip U20 (246), pin 18, on controller board (28b) which is read over the digital bus by microprocessor U1 (84). All other breakers are sensed in a similar manner, although the pins and connector locations vary.

In many instances, the equipment utilized in the system (20) and method of the present invention is placed in a small electrical closet with other distribution equipment. These areas are often totally enclosed, locked, and not air-conditioned. Also, user experiences with older lead-acid batteries can lead to fears of hydrogen gas build-up when batteries are overcharged. For these reasons, control of a room exhaust fan could alleviate many problems associated with the utilization of battery operated, high powered equipment.

The system (20) and method of the present invention thus have a set of relay contacts available which can run an external exhaust fan where it could be beneficial, such as during high battery charge, high ambient temperature, and emergency inverter operation. Exhaust fan operation during high battery charge will vent any hydrogen gas that may be expelled by standard lead-acid batteries. Exhaust fan operation during high room temperature and inverter operation will help exhaust room heat as well as heat generated by inverter operation, when air-conditioning is not present or is not operational.

Figure 14:
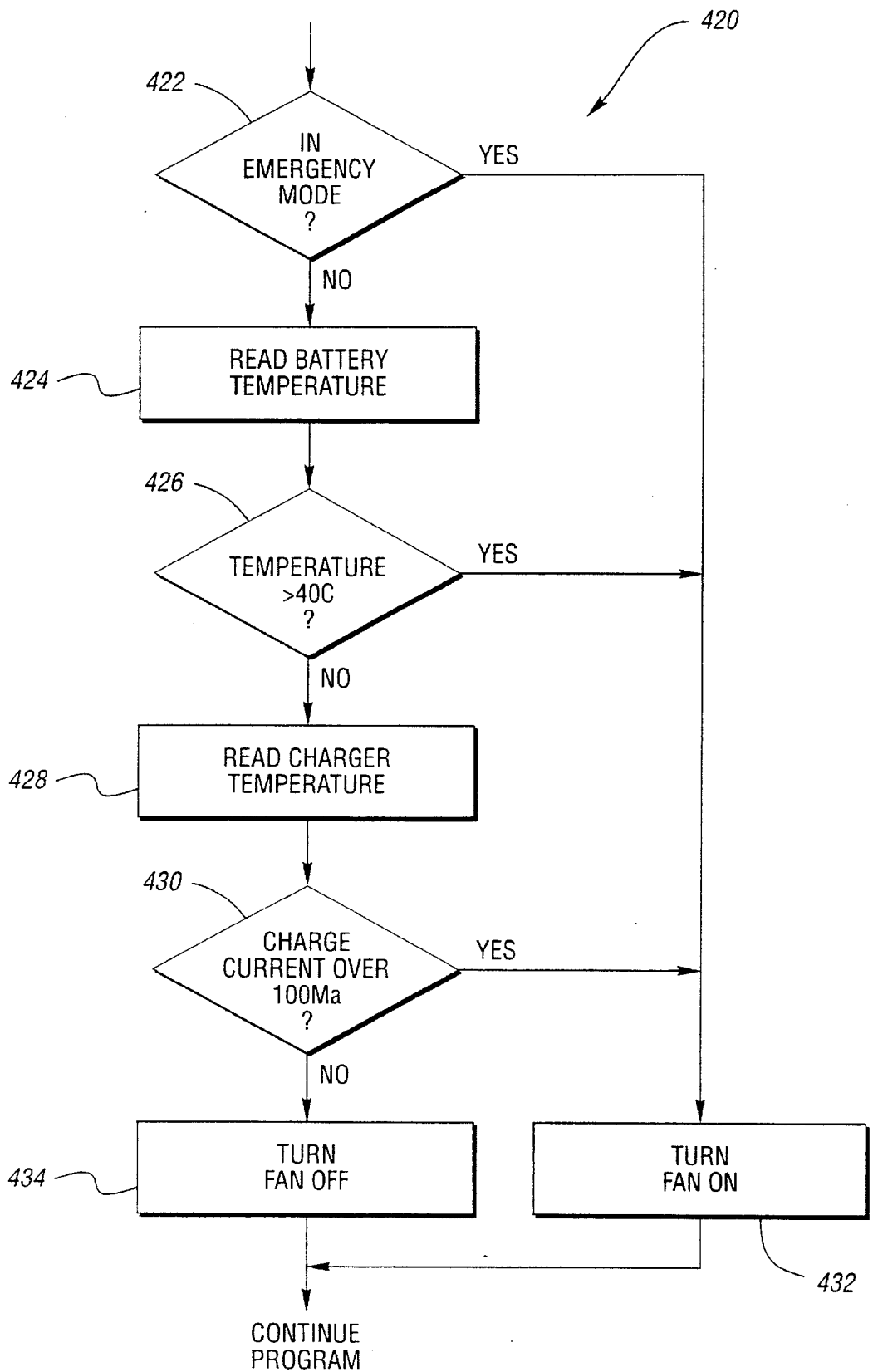
FIG. 14 is a fan control flowchart of the system and method of the present invention for providing an alternate AC voltage to an electrical load having a main AC voltage.

Referring, then, to FIG. 14, a fan control flowchart of the system (20) and method of the present invention for providing an alternate AC voltage to an electrical load having a main AC voltage is shown, denoted generally by reference numeral 420. As seen therein, if the inverter is operational (422), the battery temperature exceeds 40 degrees Celsius (424, 426), or the charger current exceeds 100 milliamperes (428, 430), then an exhaust fan is activated (432). If none of these conditions exist, the exhaust fan, if previously activated, is deactivated (434). The cycle that checks for required exhaust fan operation is repeated approximately once every second.

Referring again to FIGS. 2, 4(*a*), 4(*b*) and 5, the hardware relating to exhaust fan operation is shown. The system (20) and method of the present invention generate a DC power source temperature signal, compare the DC power source temperature signal to a temperature reference value, compare the sum of the charger current signals to a current reference value, generate a first fan control signal operative to activate a fan when the DC power source signal exceeds the temperature reference value, and generate a second fan control signal operative to activate a fan when the sum of the charger current signals exceeds the current reference value as follows.

The controller (28) feeds a signal to transfer module (38) which, in turn, energizes a relay (436) that controls the external fan (438). More specifically, microprocessor U1 (84) on controller board (28*b*) outputs a digital signal when the fan (438) is to be operated. This signal is output on latch U6 (100), pin 6, that feeds this digital signal to isolator U64 (440) on controller board (28*a*), whose output is placed on the TRANSFER connector (76), pin 4, that routes the signal to the transfer board (70). On the transfer board (70), the signal is placed on the base of driver transistor Q8 (442) that drives the output relay FANA (444). The contacts of FANA relay (444) are on TS3, pins 2 and 3, that may be to energize the external fan.

Figure 15:
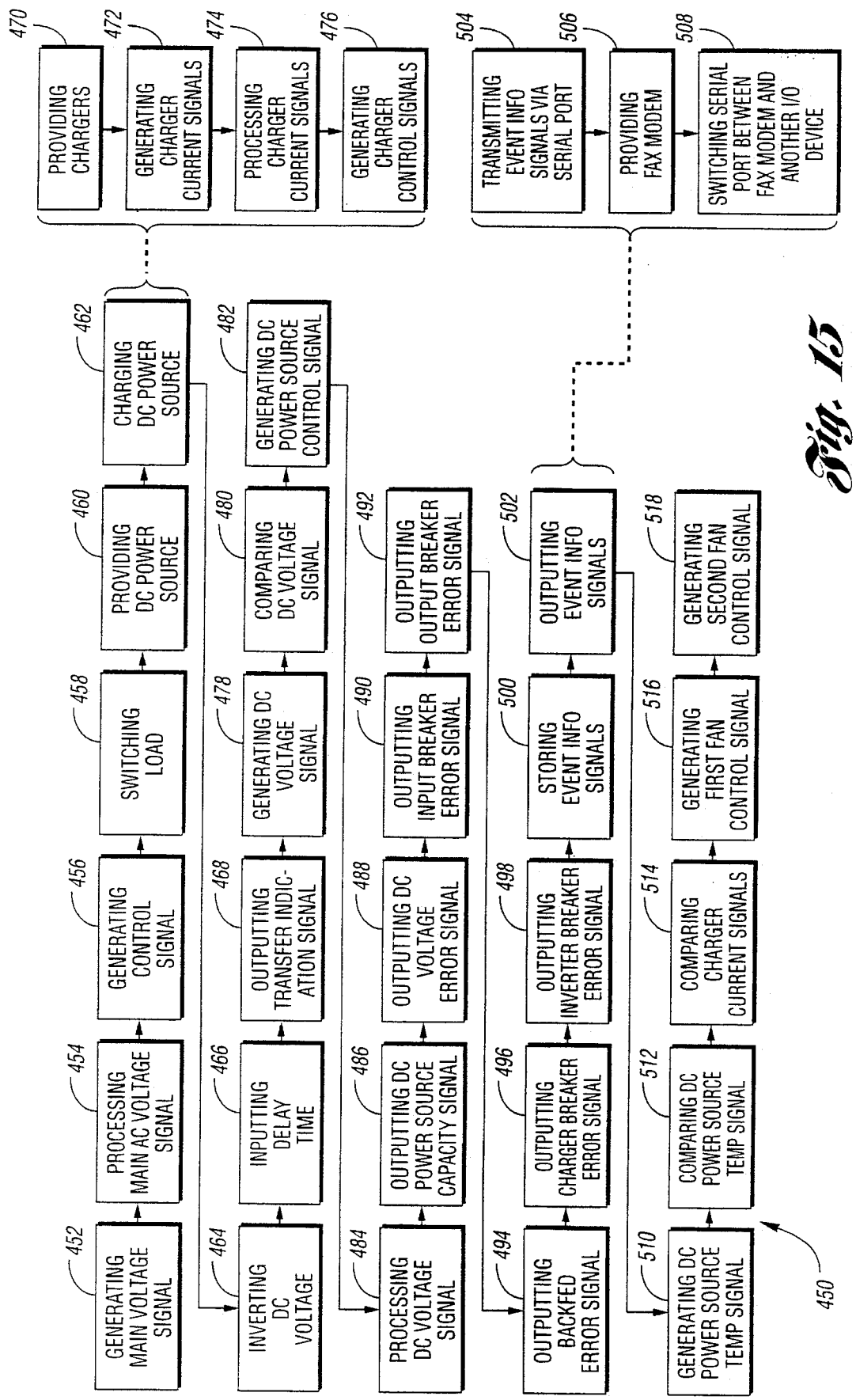
FIG. 15 is a block diagram of the method of the present invention for providing an alternate AC voltage to an electrical load having a main AC voltage.

Referring finally to FIG. 15, a block diagram of the method of the present invention for providing an alternate AC voltage to an electrical load having a main AC voltage is shown, denoted generally by reference numeral 450. As seen therein, and as described in greater detail above with respect to the system (20) of the present invention, the method (450) comprises generating (452) a main AC voltage signal representing the value of the main AC voltage, and processing (454) the main AC voltage signal to determine a status of the main AC voltage, a main AC voltage failure time period, and a main AC voltage restoration time period. The method (450) further comprises generating (456) a control signal in response to the main AC voltage failure time period, the main AC voltage restoration time period, and a pre-selected delay time period, and switching (458) the electrical load between the main AC voltage and the alternate AC voltage in response to the control signal.

The method (450) of the present invention for providing an alternate AC voltage to an electrical load having a main AC voltage may also comprise providing (460) a DC power source for supplying a DC voltage, charging (462) the DC power source, and inverting (464) the DC voltage to the alternate AC voltage. The method (450) may further comprise inputting (466) the pre-selected delay time period, and outputting (468) a transfer signal in response to the control signal.

Charging (462) the DC power source may itself comprise providing (470) a plurality of chargers, each charger supplying a current to the DC power source, and generating (472) a plurality of charger current signals, each charger current signal representing the magnitude of the current supplied to the DC power source of one of the plurality of chargers. Charging (462) the DC power source may further comprise processing (474) the charger current signals to determine a relative relationship therebetween, and generating (476) a plurality of charger control signals, each charger control signal for receipt by one of the plurality of chargers, the plurality of charger control signals operative to equalize the currents supplied by the plurality of chargers.

Still referring to FIG. 15, the method (450) of the present invention may further comprise generating (478) a DC voltage signal representing the magnitude of the DC voltage supplied by the DC power source, comparing (480) the DC voltage signal to a pre-determined reference value, and generating (482) a DC power source control signal operative to isolate the DC power source when the DC voltage signal is less than the pre-determined value and the status signal indicates that the main AC voltage is active. The method (450) may still further comprise processing (484) the DC voltage signal to determine a DC power source capacity, outputting (486) a DC power source capacity signal in response to the DC power source capacity determined, and outputting (488) a DC voltage error signal in response to the DC power source control signal.

The method (450) of the present invention for providing an alternate AC voltage to an electrical load having a main AC voltage may also comprise outputting (490) an input breaker error signal when a breaker for selectively isolating a system input is opened, outputting (492) an output breaker error signal when a breaker for selectively isolating a system output is opened, and outputting (494) a backfeed error signal when the system output is directly connected to the system input. The method (450) may further comprise outputting (496) a charger breaker error signal when a breaker for selectively isolating the charger is opened, and outputting (498) an inverter breaker error when a breaker for selectively isolating the inverter is opened.

The method (450) of the present invention may yet further comprise storing (500) event information signals in a memory, and outputting (502) the event information signal. Outputting (502) the event information signal may itself comprise transmitting (504) the event information signal via a serial port, providing (506) a facsimile machine having an internal memory for storing an output form for the event information signal, and switching (508) the serial port between the facsimile machine and at least one other input/output device.

Finally, the method (450) of the present invention for providing an alternate AC voltage to an electrical load having a main AC voltage may further comprise generating (510) a DC power source temperature signal, comparing (512) the DC power source temperature signal to a temperature reference value, and comparing (514) the sum of the charger current signals to a current reference value. The method (450) may also comprise generating (516) a first fan control signal operative to activate a fan when the DC power source signal exceeds the temperature reference value, and generating (518) a second fan control signal operative to activate a fan when the sum of the charger current signals exceeds the current reference value.

As is readily apparent from the foregoing description and drawings, the present invention provides an improved system (20) and method (450) for providing an alternate AC voltage to an electrical load having a main AC voltage failure. As is also apparent, the present invention provides a system (20) and method (450) for providing an alternate AC voltage to an electrical load having a main AC voltage failure that automatically provides a plurality of output messages for improved operation, maintenance and record keeping. The present invention also provides, as again is apparent, a system (20) and method (450) for providing an alternate AC voltage to an electrical load having a main AC voltage failure that, after main AC voltage restoration, transfers the electrical load back to the main AC voltage as soon as possible.

The system (20) and method (450) of the present invention for providing an alternate AC voltage to an electrical load having a main AC voltage have been described and shown herein in conjunction with the provision of alternate AC voltage to a commercial building in the event of main AC voltage (i.e. utility power) failure. However, it should be readily apparent that the system (20) and method (450) of the present invention are suitable for use in any application where any type of alternate AC voltage for any type of single phase electrical load may be required.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

We claim:

1. A system for use with primary and secondary electrical loads having a main AC voltage source, the system providing an alternate AC voltage source to the primary electrical load in the event of a failure of the main AC voltage source, the system comprising:

means for selecting a delay time period based on the secondary electrical load;

means for generating a main AC voltage signal representing the voltage of the main AC voltage source;

means for processing the main AC voltage signal to determine a status of the main AC voltage, a main AC voltage failure time period, and a main AC voltage restoration time period;

means for generating a control signal in response to the main AC voltage status, the main AC voltage failure time period, the main AC voltage restoration time period, and the delay time period selected; and means for switching the primary electrical load between the main AC voltage source and the alternate AC voltage source in response to the control signal such that the alternate AC voltage source is conserved.

2. The system of claim 1 further comprising:

a DC power source for supplying a DC voltage;

means for charging the DC power source;

means for inverting the DC voltage to the alternate AC voltage;

means for inputting the pre-selected delay time period; and means for outputting a transfer indication signal in response to the control signal.

3. The system of claim 2 wherein the means for charging the DC power source comprises:

a plurality of chargers, each charger supplying a current to the DC power source;

means for generating a plurality of charger current signals, each charger current signal representing the magnitude of the current supplied to the DC power source by one of the plurality of chargers;

means for processing the charger current signals to determine a relative relationship therebetween; and means for generating a plurality of charger control signals, each charger control signal for receipt by one of the plurality of chargers, the plurality of charger control signals operative to equalize the currents supplied by the plurality of chargers.

4. The system of claim 2 further comprising:

means for generating a DC voltage signal representing the magnitude of the DC voltage supplied by the DC power source;

means for comparing the DC voltage signal to a reference value; and means for generating a DC power source control signal operative to isolate the DC power source when the DC voltage signal is less than the reference value and the main AC voltage signal indicates that the main AC voltage is active.

5. The system of claim 4, further comprising:

means for processing the DC voltage signal to determine a DC power source capacity;

means for outputting a DC power source capacity signal in response to the DC power source capacity determined; and means for outputting a DC voltage error signal in response to the DC power source control signal.

6. The system of claim 2 further comprising:

means for outputting an input breaker error signal when a breaker for selectively isolating a system input is opened;

means for outputting an output breaker error signal when a breaker for selectively isolating a system output is opened;

means for outputting a back-feed error signal when the system output is directly connected to the system input;

means for outputting a charger breaker error signal when a breaker for selectively isolating the means for charging is opened; and means for outputting an inverter breaker error signal when a breaker for selectively isolating the means for inverting is opened.

7. The system of claim 1 further comprising:

means for storing an event information signal; and means for outputting the event information signal.

8. The system of claim 7 wherein the means for outputting the event information signal comprises:

means for transmitting the event information signal via a serial port;

a facsimile machine having an internal memory for storing an output form for the event information signal; and means for switching the serial port between the facsimile machine and at least one other input/output device.

9. The system of claim 3 further comprising:

means for generating a DC power source temperature signal;

means for comparing the DC power source temperature signal to a temperature reference value;

means for comparing the sum of the charger current signals to a current reference value;

means for generating a first fan control signal operative to activate a fan when the DC power source signal exceeds the temperature reference value; and means for generating a second fan control signal operative to activate a fan when the sum of the charger current signals exceeds the current reference value.

10. A system for use with primary and secondary electrical loads having a main AC voltage source, the system providing an alternate AC voltage source to the primary electrical load in the event of a failure of the main AC voltage source, the system comprising:

means for selecting a delay time period based on the secondary electrical load;

a signal generator for generating a main AC voltage signal representing the voltage of the main AC voltage source;

a processor for processing the main AC voltage signal to determine a status of the main AC voltage, a main AC voltage failure time period, and a main AC voltage restoration time period;

a control signal generator for generating a control signal in response to the main AC voltage status, the main AC voltage failure time period, the main AC voltage restoration time period, and the delay time period selected; and a controller for switching the primary electrical load between the main AC voltage source and the alternate AC voltage source in response to the control signal such that the alternate AC voltage source is conserved.

11. A method for use with primary and secondary electrical loads having a main AC voltage source, the system providing an alternate AC voltage source to the primary electrical load in the event of a failure of the main AC voltage source, the method comprising:

selecting a delay time period based on the secondary electrical load;

generating a main AC voltage signal representing the voltage of the main AC voltage source;

processing the main AC voltage signal to determine a status of the main AC voltage, a main AC voltage failure time period, and a main AC voltage restoration time period;

generating a control signal in response to the main AC voltage status, the main AC voltage failure time period, the main AC voltage restoration time period, and the delay time period selected; and switching the primary electrical load between the main AC voltage source and the alternate AC voltage source in response to the control signal such that the alternate AC voltage source is conserved.

12. The method of claim 11 further comprising:

providing a DC power source for supplying a DC voltage;

charging the DC power source;

inverting the DC voltage to the alternate AC voltage;

inputting the pre-selected delay time period; and outputting a transfer indication signal in response to the control signal.

13. The method of claim 12 wherein charging the DC power source comprises:

providing a plurality of chargers, each charger supplying a current to the DC power source;

generating a plurality of charger current signals, each charger current signal representing the magnitude of the current supplied to the DC power source by one of the plurality of chargers;

processing the charger current signals to determine a relative relationship therebetween; and generating a plurality of charger control signals, each charger control signal for receipt by one of the plurality of chargers, the plurality of charger control signals operative to equalize the currents supplied by the plurality of chargers.

14. The method of claim 12 further comprising:

generating a DC voltage signal representing the magnitude of the DC voltage supplied by the DC power source;

comparing the DC voltage signal to a predetermined reference value; and generating a DC power source control signal operative to isolate the DC power source when the DC voltage signal is less than the pre-determined value and the main AC voltage signal indicates that the main AC voltage is active.

15. The method of claim 14 further comprising:

processing the DC voltage signal to determine a DC power source capacity;

outputting a DC power source capacity signal in response to the DC power source capacity determined; and outputting a DC voltage error signal in response to the DC power source control signal.

16. The method of claim 11 further comprising:

outputting an input breaker error signal when a breaker for selectively isolating a system input is opened;

outputting an output breaker error signal when a breaker for selectively isolating a system output is opened; and outputting a back-feed error signal when the system output is directly connected to the system input.

17. The method of claim 12 further comprising:

outputting a charger breaker error signal when a breaker for selectively isolating a charger for charging the DC power source is opened; and outputting an inverter breaker error signal when a breaker for selectively isolating an inverter for inverting the DC voltage to the alternate AC voltage is opened.

18. The method of claim 11 further comprising:

storing event information signals in a memory; and outputting the event information signal.

19. The method of claim 18 wherein outputting the event information signal comprises:

transmitting the event information signal via a serial port;

providing a facsimile machine having an internal memory for storing an output form for the event information signal; and switching the serial port between the facsimile machine and at least one other input/output device.

20. The method of claim 13 further comprising:

generating a DC power source temperature signal;

comparing the DC power source temperature signal to a temperature reference value;

comparing the sum of the charger current signals to a current reference value;

generating a first fan control signal operative to activate a fan when the DC power source signal exceeds the temperature reference value; and generating a second fan control signal operative to activate a fan when the sum of the charger current signals exceeds the current reference value.

21. A system for use with primary and secondary electrical loads having a main AC voltage source, the system providing an alternate AC voltage source to the primary electrical load in the event of a failure of the main AC voltage source, the system comprising:

means for selecting a delay time period based on the secondary electrical load;

a signal generator for generating a main AC voltage signal representing the voltage of the main AC voltage source;

a processor for processing the main AC voltage signal to determine a failure of the main AC voltage, a main AC voltage failure time period, a restoration of the main AC voltage, and a main AC voltage restoration time period; and a controller for
   a) isolating the secondary electrical load and switching the primary electrical load from the main AC voltage source to the alternate AC voltage source at a failure of the main AC voltage source, and
   b) connecting the secondary electrical load to the main AC voltage and switching the primary electrical load from the alternate AC voltage source to the main AC voltage source after restoration of the main AC voltage based on the delay time period selected, the failure time period, and the restoration time period so that the alternate AC voltage source is conserved.

22. A method for use with primary and secondary electrical loads having a main AC voltage source, the method providing an alternate AC voltage source to the primary electrical load in the event of a failure of the main AC voltage source, the method comprising:

selecting a delay time period based on the secondary electrical load;

generating a main AC voltage signal representing the voltage of the main AC voltage source;

processing the main AC voltage signal to determine a failure of the main AC voltage, a main AC voltage failure time period, a restoration of the main AC voltage, and a main AC voltage restoration time period;

isolating the secondary electrical load and switching the primary electrical load from the main AC voltage source to the alternate AC voltage source at a failure of the main AC voltage source; and connecting the secondary electrical load to the main AC voltage and switching the primary electrical load from the alternate AC voltage source to the main AC voltage source after a restoration of the main AC voltage based on the delay time period selected, the failure time period, and the restoration time period so that the alternate AC voltage source is conserved.

* * * * *